(12) United States Patent
Hayashi

(10) Patent No.: US 6,204,968 B1
(45) Date of Patent: Mar. 20, 2001

(54) ZOOM LENS SYSTEM HAVING A CAMERA SHAKE COMPENSATING FUNCTION

(75) Inventor: Kohtaro Hayashi, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/296,926

(22) Filed: Apr. 22, 1999

Related U.S. Application Data

(63) Continuation of application No. 08/524,745, filed on Sep. 7, 1995, now abandoned.

(30) Foreign Application Priority Data

Sep. 14, 1994 (JP) .................................................. 6-219711

(51) Int. Cl.$^7$ .................................................. G02B 27/64
(52) U.S. Cl. .......................... 359/557; 359/554; 359/689
(58) Field of Search .................................. 359/554–557, 359/676–677, 683, 684, 689, 708, 738–740; 396/52–55; 348/208

(56) References Cited

U.S. PATENT DOCUMENTS

| | | | |
|---|---|---|---|
| 4,773,744 | 9/1988 | Yamanashi | 359/689 |
| 4,907,868 | 3/1990 | Kitagishi et al. | 359/557 |
| 4,974,950 | 12/1990 | Yamazaki et al. | 359/557 |
| 5,069,537 | 12/1991 | Kitagishi | 359/557 |
| 5,267,084 | 11/1993 | Nozawa | 359/689 |
| 5,331,467 | * 7/1994 | Sato | 359/557 |
| 5,353,159 | * 10/1994 | Morooka | 359/689 |
| 5,638,210 | * 6/1997 | Sato et al. | 359/557 |

FOREIGN PATENT DOCUMENTS

| | | | |
|---|---|---|---|
| 1116619 | 5/1989 | (JP) . | |
| 2103014 | 4/1990 | (JP) . | |
| 293620 | 4/1990 | (JP) . | |
| 4212916 | 8/1992 | (JP) . | |
| 4362909 | 12/1992 | (JP) . | |
| 695039 | 4/1994 | (JP) . | |
| 6-95039 | * 4/1994 | (JP) | 359/557 |

* cited by examiner

*Primary Examiner*—Thong Nguyen
(74) *Attorney, Agent, or Firm*—Price and Gess

(57) ABSTRACT

A zoom lens system includes from the object side a first lens unit of a positive refractive power, a second lens unit of a positive refractive power, an aperture stop and a third lens unit of a negative refractive power. The second lens unit includes a front lens unit of a negative refractive power and a rear lens unit of a positive refractive power. In zooming from the shorter focal length side to the longer focal length side, the distance between the first and second lens units increases and the distance between the second and third lens units varies. Camera shake is compensated for by parallel decentering the entire second lens unit.

14 Claims, 17 Drawing Sheets

FNO=3.55

— d
----- SC

-0.5   0.5
SPHERICAL SINE
ABERRATION CONDITION

Y'=21.6

----- DM
— DS

-0.5   0.5
ASTIGMATISM

Y'=21.6

-2.0   2.0
DISTORTION %

FNO=9.57

— d
----- SC

-0.5   0.5
SPHERICAL SINE
ABERRATION CONDITION

Y'=21.6

----- DM
— DS

-0.5   0.5
ASTIGMATISM

Y'=21.6

-2.0   2.0
DISTORTION %

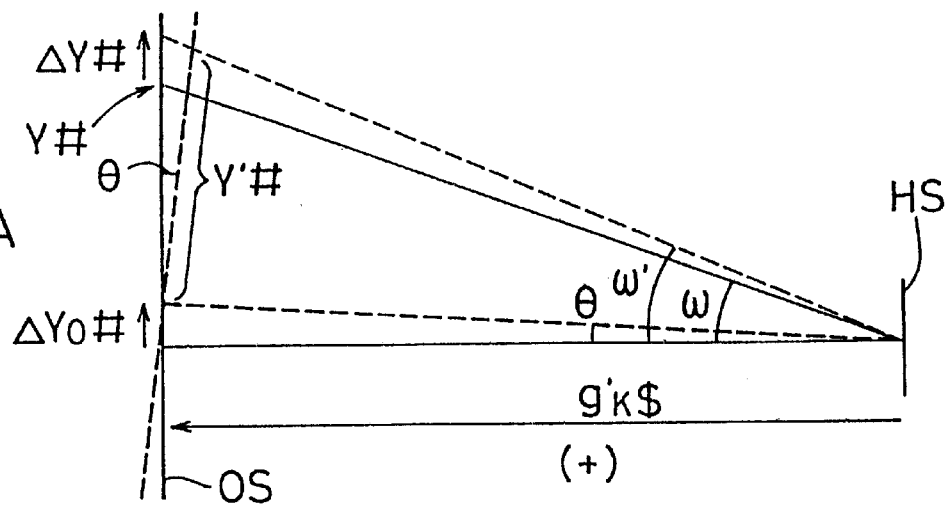
FIG.18A
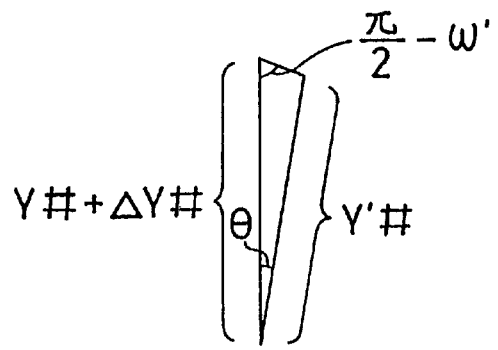
FIG.18B
FIG.19
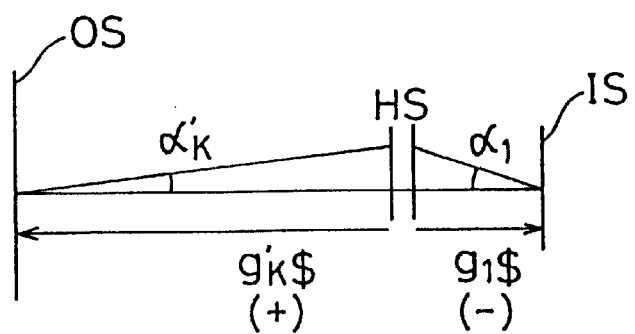

ZOOM LENS SYSTEM HAVING A CAMERA SHAKE COMPENSATING FUNCTION

This Application is a Continuation of the U.S. application, Ser. No. 08/524,745, filed on Sep. 07, 1995, now abandoned.

BACKGROUND OF THE INVENTION

1. Field of the Invention

The present invention relates to a zoom lens system having a camera shake compensating function, and more specifically, to a zoom lens system having a camera shake compensating function suitable for use in a lens shutter camera, capable of preventing image blur due to camera shake (i.e. shake of the camera caused when the user holds the camera to perform photographing).

2. Description of the Prior Art

Conventionally, the failure in photographing was mostly attributed to camera shake and being out of focus. In recent years; however, most cameras employ the automatic focusing mechanism and with the improvement of focusing accuracy of the automatic focusing mechanism, the problem of the failure in photographing due to being out of focus has been practically solved. On the other hand, the lens system normally incorporated in the camera has shifted from a fixed focal length lens system to a zoom lens system, and with the shift, the magnification and the longest focal length have been increased. Consequently, camera shake very frequently occurs. As a result, presently, it is no exaggeration to say that a major cause of failure in photographing is caused by camera shake. For this reason, a camera shake compensating function can be indispensable for the zoom lens system.

As zoom lens systems having a camera shake compensating function, zoom lens systems have been proposed in which camera shake is compensated for by decentering a part of the lens (Japanese Laid-open Patent Applications Nos. H1-116619, H2-103014, H2-93620, H4-362909, H4-212916 and H6-95039).

In a zoom lens system having a camera shake compensating function, not only the optical performance is excellent in a standard condition (hereinafter, sometimes referred to as "predecentering condition") but also the generation of aberrations (hereinafter, referred to as "decentering aberrations") caused by the decentering of the lens is curbed to maintain the optical performance in a compensated condition (hereinafter, sometimes referred to as "post-decentering condition). In the above-mentioned prior arts, however, since the degradation of optical performance due to the decentering is great, sufficient optical performance is not obtained in the entire zoom range. Furthermore, the increase in magnification and the reduction in size are not sufficiently achieved.

SUMMARY OF THE INVENTION

An object of the present invention is to provide a high-magnification, compact zoom lens system having a camera shake compensating function, capable of compensating camera shake while maintaining high optical performance in the entire zoom range.

BRIEF DESCRIPTION OF THE DRAWINGS

This and other objects and features of this invention will become clear from the following description, taken in conjunction with the preferred embodiments with reference to the accompanied drawings in which:

FIGS. 5A to 3B show meridional lateral aberrations of the first embodiment at the shortest focal length condition before decentering;

FIGS. 18A to 18B show are views of assistance in explaining rotational conversion; and FIG. 19 is a view of assistance in explaining conversion to the image surface.

DESCRIPTION OF THE PREFERRED EMBODIMENTS

Figure 1:
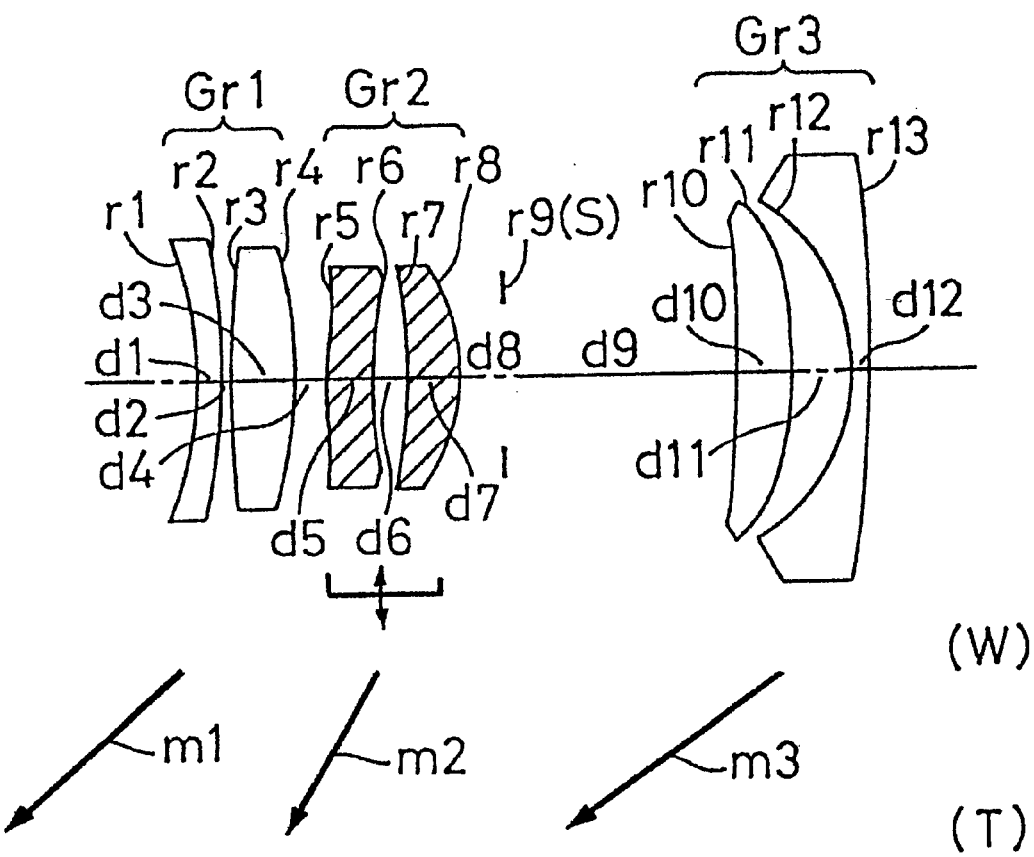
FIG. 1 shows the lens arrangement of a first embodiment of the present invention.

A zoom lens system having a camera shake compensating function according to a first implementation of the present invention comprises from the object side a first lens unit of a positive refractive power, a second lens unit of a positive refractive power, an aperture stop and a third lens unit of a negative refractive power. The second lens unit includes from the object side a front lens unit of a negative refractive power and a rear lens unit of a positive refractive power. Zooming is performed by varying the distance between the first and second lens units and the distance between the second and third lens units so that the distance between the first and second lens units increases in zooming from the shorter focal length side to the longer focal length side. Camera shake is compensated for by parallelingly decentering the entire second lens unit.

A zoom lens system having a camera shake compensating function according to a second implementation of the present invention comprises from the object side a first lens unit of a positive refractive power, a second lens unit of a positive refractive power, an aperture stop and a third lens unit of a negative refractive power. The second lens unit includes from the object side a front lens unit of a negative refractive power and a rear lens unit of a positive refractive power. Zooming is performed by varying the distance between the first and second lens units and the distance between the second and third lens units so that the distance between the first and second lens units increases in zooming from the shorter focal length side to the longer focal length side. Camera shake is compensated for by parallelingly decentering the entire second lens unit. Further, the following conditions (1) and (2) are fulfilled:

$$0 < \frac{\phi_I}{\phi_W} < 0.57 \quad (1)$$

$$0.03 < \frac{\phi_{DF}}{C_{DR}} < 0.5 \quad (2)$$

where $\phi_I$ is a refractive power of the first lens unit, $\phi_W$ is a refractive power of the entire lens system at the shortest focal length condition, $\phi_{DF}$ is a refractive power of the front lens unit (i.e. the negative lens unit on the object side) of the second lens unit, and $C_{DR}$ is a curvature of the most image side surface of the second lens unit.

The parallel decentering is to move a part of the optical system in a direction vertical (or substantially vertical) to the optical axis. In the present invention, as the optical system (hereinafter, referred to as "compensation lens unit") parallelingly decentered for camera shake compensation, the entire second lens unit (i.e. all the lens elements of the second lens unit) which is one of the zooming lens units is used. Since aberrations in the zooming lens units are typically corrected within the lens units, with this arrangement, not only aberrations in the standard condition but also the decentering aberrations are corrected more excellently than in the prior art (e.g. Japanese Laid-open Patent Applications Nos. H2-103014, H2-93620, H4-362909 and H6-95039). On the contrary, when camera shake is compensated for by decentering a part of the lens units constituting the zooming lens units, it is necessary to correct aberrations by the part of the lens units and further by the entire zoom lens units, so that the number of lens elements increases to increase the total length of the lens system.

Since the second lens unit serving as a compensation lens unit is of a negative, positive configuration and an aperture stop is arranged therebehind, distortion is made negative (aberration coefficient V is positive) by the second lens unit. Since the off-axial image point movement error caused thereby is positive, the negative off-axial image point error invariably generated by rotational camera shake is canceled more effectively than in the prior art (e.g. Japanese Laid-open Patent Application No. H1-116619).

In a zoom lens system which includes only a positive compensation lens unit and a negative lens unit and in which the distance between the lens units increases in zooming toward the longer focal length side, the magnitude of lateral chromatic aberration largely differs between on the shorter focal length side and on the longer focal length side. Further, since axial lateral chromatic aberration caused by the decentering is added thereto in camera shake compensation, the total of the lateral chromatic aberration is impermissible. In the present invention, to excellently correct the lateral chromatic aberration, a positive lens unit (first lens unit) in which the distance from the compensation lens unit increases in zooming toward the longer focal length side is arranged in front of the compensation lens unit.

When the first lens unit is negative (when the lower limit of the condition (1) is exceeded), large negative distortion is generated in the first lens unit, so that the off-axial image a point movement error increases toward the positive side. When the refractive power of the first lens unit is too high toward the positive side (when the upper limit of the condition (1) is exceeded), a large positive distortion is generated in the first lens unit, so that the off-axial image point movement error increases toward the negative side. Therefore, by fulfilling the condition (1), distortion is corrected excellently and the off-axial image point movement error is restrained to be small compared to the prior art (e.g. Japanese Laid-open Patent Applications Nos. H1-116619 and H4-212916).

It is preferable that the most image side surface (i.e. the surface closest to the aperture stop) of the second lens unit serving as a compensation lens unit is convex to the image side. The negative front lens unit of the second lens unit generates negative distortion and large positive spherical aberration (aberration coefficient I is negative) and causes the generation of axial coma in camera shake compensation on the longer focal length side. If the most aperture stop side surface of the compensation lens unit is (comparatively strongly) convex to the image side, since the surface is close to the aperture stop, the surface does not generate distortion but generates negative spherical aberration. Thereby, the spherical aberration in the compensation lens unit can be reduced and the axial coma in camera shake compensation on the longer focal length side can be reduced. The condition (2) defines a condition therefor, and by fulfilling the condition (2), spherical aberration is excellently corrected. When the lower limit of the condition (2) is exceeded, spherical aberration increases toward the negative side. When the upper limit of the condition (2) is exceeded, spherical aberration increases toward the positive side.

Moreover, it is preferable that the zoom lens system according to the present invention has at least one concave lens element in its first lens unit, has at least one concave lens element in the negative front lens unit of its second lens unit, and fulfills the following condition (3):

$$-0.7 < \frac{(0.7 \times C_{1M}) + C_{2M}}{\phi_{WIDE}} < 0 \qquad (3)$$

where $C_{1M}$ is a curvature of the object side surface of the concave lens element in the first lens unit, $C_{2M}$ is a curvature of the object side surface of the negative concave lens element in the second lens unit, and $\phi_{Wide}$ is a refractive power of the entire lens system at the shortest focal length condition.

Most of the effects of the first and second lens units on distortion on the shorter focal length side are caused by the influence of the curvatures $C_{1M}$ and $C_{2M}$. When the power relationships are substantially the same, distortion is not largely affected by another factor such as curvature. The off-axial image point movement error depends on the effect of the distortion generated in the first lens unit and the effect of the distortion generated in the second lens unit. The effect of the distortion of the first lens unit on the off-axial image point movement error is approximately 70% the effect of the distortion of the second lens unit on the off-axial image point movement error.

To excellently correct the off-axial image point movement error, the condition (3) is fulfilled. When the lower limit of the condition (3) is exceeded, the effect of the strongly negative lens element concave to the object side increases, so that large negative distortion increases the off-axial image point movement error toward the positive side. When the upper limit of the condition (3) is exceeded, negative off-axial image point movement error caused by a rotation of an object surface (described later in calculation with aberration coefficients) cannot be corrected.

Subsequently, a definition of aberration degradation in a camera shake compensating optical system like that of the present invention will be described with reference to FIGS. 13A to 13D. The decentering aberrations (off-axial image point movement error, one-side blur, axial coma and axial lateral chromatic aberration) shown in the figures cause the image degradation of the camera shake compensating optical system.

Figure 13A:
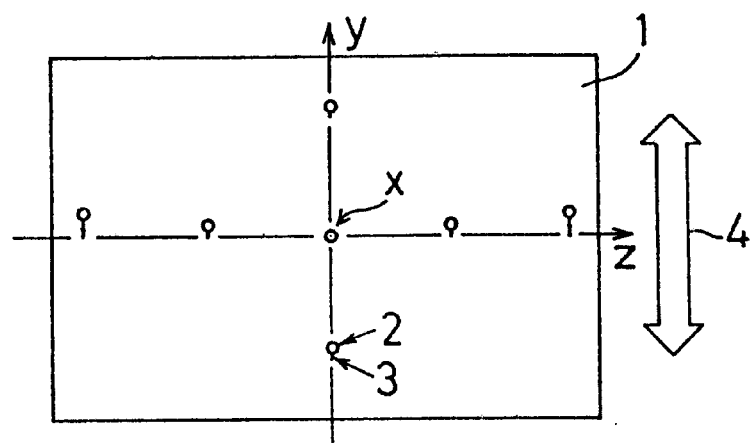
FIGS. 13A to 13D are views of assistance in explaining the factors of image degradation of the camera shake compensating optical system.

Off-axial Image Point Movement Error {FIG. 13A}

In a decentered optical system, a distortion due to the decentering is generated in addition to the normal distortion. For this reason, in a camera shake compensating optical system, when camera shake is compensated for so that the axial (in the center of the image plane) image point completely stops, the off-axial image point does not completely stop to cause an image blur. In FIG. 13A, reference numeral 1 represents a film plane, reference numeral 2 represents an image point in the compensated condition (post-decentering condition), reference numeral 3 represents an image point in the standard condition (pre-decentering condition), and reference numeral 4 represents a direction of camera shake compensation.

When the optical axis is along the X-axis, the camera shake direction is along the Y-axis (i.e. a camera shake compensation direction 4 is also along the Y-axis) and Y(y', z', θ') is a Y coordinate (always y(0, 0, θ)=0 since camera shake is compensated for so that the axial image point completely stops) of the actual image point of a light beam with a paraxial image point (y', z') at a compensation angle θ, the following expression (a) holds:

$$\Delta Y(y', z', \theta) = Y(y', z', \theta) - Y(y', z', 0) \qquad (a)$$

Unless specifically indicated, an off-axial image point movement error $\Delta Y_Y'$ with respect to the image point on the Y-axis and an off-axial image point movement error $\Delta Y_Z'$ with respect to the image point on the Z-axis are represented by the following expressions (b) and (c):

$$\Delta Y_Y' = \{\Delta Y(0.7\text{field}, 0, 0.7°) + \Delta Y(-0.7\text{field}, 0, 0.7°)\}/2 \qquad (b)$$

$$\Delta Y_Z' = \Delta Y(0, 0.7\text{field}, 0.7°) \qquad (c)$$

where 0.7field is approximately 15 mm in 35 mm film.

Figure 13B:
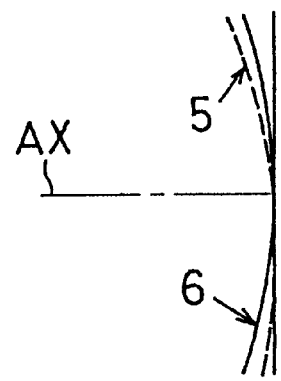

One-side Blur {FIG. 13B}

Referring to FIG. 13B, reference numeral 5 represents an image plane which is asymmetric with respect to an optical axis AX, and reference numeral 6 represents an image plane which is symmetric with respect to the optical axis. Because of the asymmetry of the optical system, the image plane 5 is asymmetric with respect to the optical axis AX. Consequently, a meridional one-side blur $\Delta M'$ and a sagittal one-side blur $\Delta S'$ are represented by the following expressions (d) and (e), respectively:

$$\Delta M' = \{\text{meridional value } (y'=0.7\text{field}, z=0, \theta=0.7°) - \text{meridional value} (y'=-0.7\text{field}, z=0, \theta=0.7°)\}/2 \qquad (d)$$

$$\Delta S' = \{\text{sagittal value } (y'=0.7\text{field}, z=0, \theta=0.7°) - \text{sagittal value } (y'=-0.7\text{field}, z=0, \theta=0.7°)\}/2 \qquad (e)$$

Figure 13C:
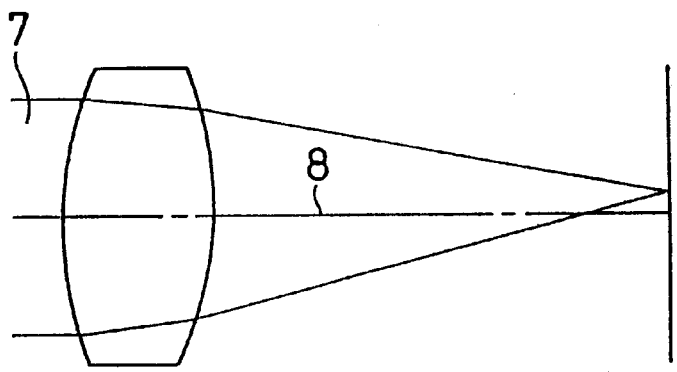

Axial Coma {FIG. 13C}

Referring to FIG. 13C, reference numeral 7 represents an axial luminous flux, and reference numeral 8 represents an axial principal light beam. As shown in the figure, the axial luminous flux 7 is not symmetric with respect to the axial principal light beam 8, so that coma is generated. An axial coma AXCM generated at the axial luminous flux 7 is represented by the following expression (f):

$$\text{AXCM} = \{Y(\text{upper zonal}, \theta=0.7°) + Y(\text{lower zonal}, \theta=0.7°)\}/2 \qquad (f)$$

Figure 13D:
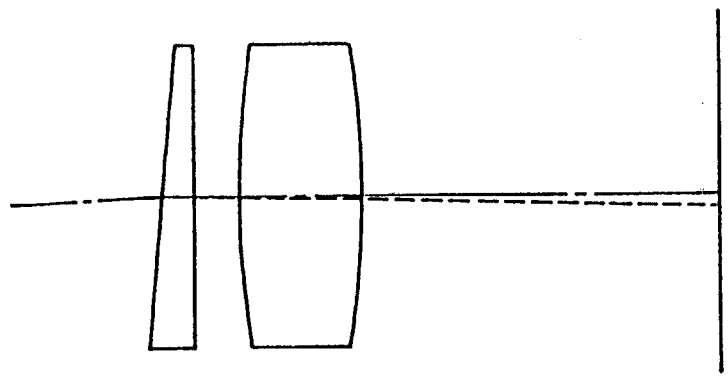

Axial Lateral Chromatic Aberration {FIG. 13D}

The image point, which shifts according to the difference in wavelength, shifts on the axial light beam when the optical system is asymmetric. The axial lateral chromatic aberration generated in the axial principal light beam is represented by the following expression (g):

$$(\text{axial lateral chromatic aberration}) = \{Y(\text{g-line}, \theta=0.7°) - Y(\text{d-line}, \theta=0.7°)\} \qquad (g)$$

With respect to the above-described decentering aberrations, an application method is shown in a paper "Theory of Tertiary Aberration of an Optical System Where Decentering Exits" by Mr. Matsui (JOEM, June, 1990). The method is suitable for a case where a normal taking lens is decentered due to an attachment error. However, it cannot be directly applied to a camera shake compensating optical system where a co-axial relationship among the object plane, the taking lens and the image plane is shifted. In order that the method of the paper can be directly applied to the camera shake compensating optical system, the actual aberrations of the camera shake compensating optical system are represented by tertiary aberration coefficients by performing the subsequently-described conversion of expressions.

Figure 14:
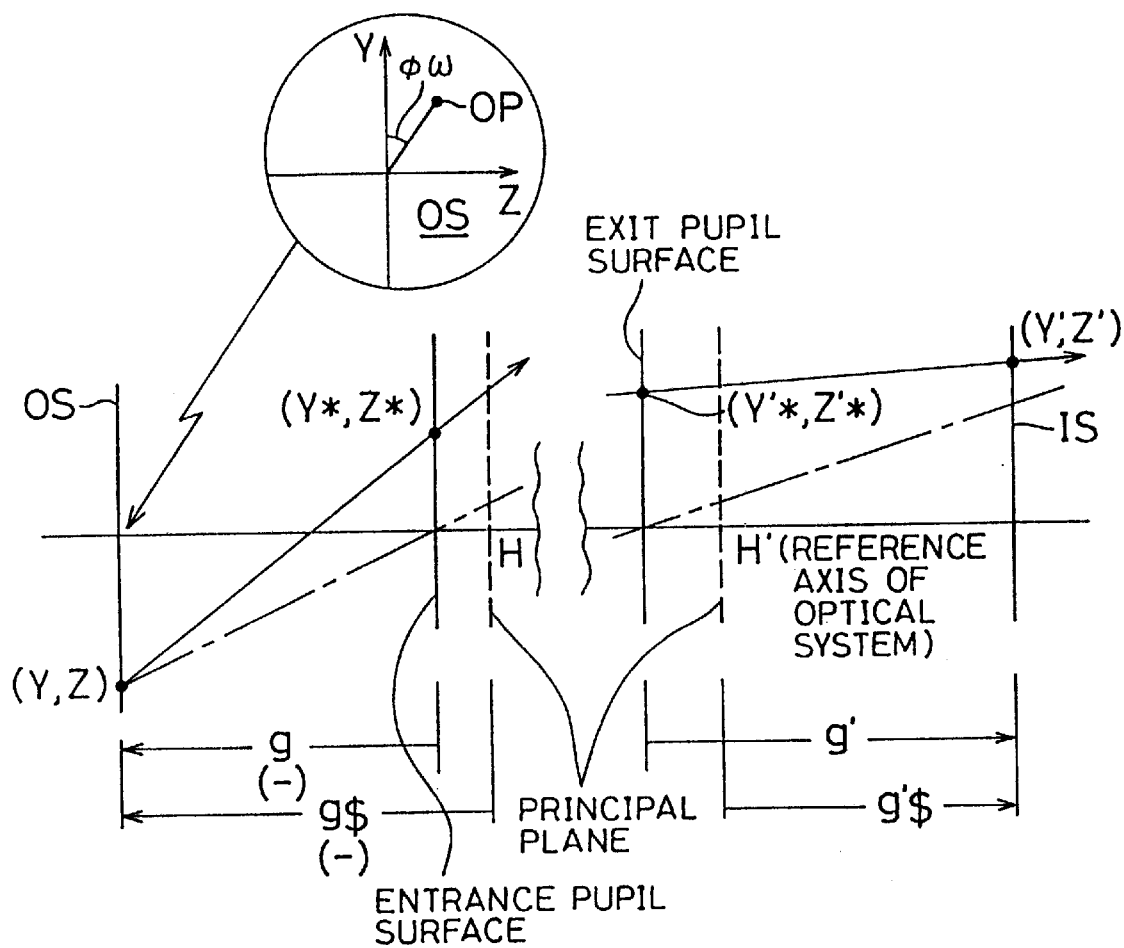
FIG. 14 is view of assistance in explaining a relationship between optical system and the coordinates.

Application of Decentering Aberration Coefficients to Camera Shake Compensating Optical System Referring to FIG. 14 showing a relationship between the optical system and coordinates, how to obtain the decentering aberration coefficients will be described. First, the expressions are defined as follows:

$$\tan\omega \cdot \cos\phi\omega = \frac{Y}{g\$}$$

$$\tan\omega \cdot \sin\phi\omega = \frac{Z}{g\$}$$

$$R \cdot \cos\phi R = \frac{g\$}{g} \cdot Y*$$

$$R \cdot \sin\phi R = \frac{g\$}{g} \cdot Z*$$

where g and g$ are an entrance pupil surface and the distance from the object side principal plane to an object plane (object surface) OS, respectively, $\omega$ is an angle of a straight line between the object point and the object side principal point H, to a reference axis and $\phi\omega$ is its azimuth, and R is a radius of entrance pupil converted on the object side principal plane and $\phi R$ is its azimuth.

Image point movement amounts $\Delta Y$ and $\Delta Z$ on an image plane (image surface) IS when a vth surface from the object side is parallelingly decentered by a slight amount Ev in the Y direction relative to the reference axis are represented by the following expressions (1A) and (1B):

$\Delta Y = -(Ev/2\alpha_k') \cdot [(\Delta E)v + (N \cdot \tan\omega)^2 \cdot \{(2+\cos 2\phi\omega) \cdot (VE1)v - (VE2)v\}$ $+ 2R \cdot (N \cdot \tan\omega) \cdot \{(2\cos(\phi R - \phi\omega) + \cos(\phi R + \phi\omega)) \cdot (IIIE)v + \cos\phi R \cdot \cos\phi\omega \cdot (PE)v\} + R^2 \cdot (2 + \cos 2\phi R) \cdot (IIE)v]$ (1A)

$\Delta Z = -(Ev/2\alpha_k') \cdot [(N \cdot \tan\omega)^2 \cdot \sin 2\phi\omega \cdot (VE1)v + 2R \cdot (N \cdot \tan\omega) \cdot \{\sin(\phi R + \phi\omega) \cdot (IIIE)v + \sin\phi R \cdot \sin\phi\omega \cdot (PE)v\} + R^2 \cdot \sin 2\phi R \cdot (IIE)v]$ (1B)

Here, when $(\Delta E)v$ is a prismatic effect (lateral shift of the image), $(VE1)v$ and $(VE2)v$ are rotationally asymmetric distortions, $(IIIE)v$ and $(PE)v$ are a rotationally asymmetric astigmatism and an inclination of the image surface, respectively, and $(IIE)v$ is a rotationally asymmetric coma which is present also on the axis, the decentering aberration coefficients representing the effects of the decentering are represented by the following expressions (1C) to (1H) based on the aberration coefficients of from the vth surface to the image surface (# is a suffix representative of "on the object surface"). In the case of rotational decentering, the decentering aberration coefficients are represented by expressions similar to the expressions (1A) to (1H):

$(\Delta E)v = -2(\alpha v' - \alpha v)$ (1C)

$(VE1)v = [\{\alpha v' \cdot (\mu = v+1 \rightarrow k)\Sigma V\mu\} - \{\alpha v \cdot (\mu = v \rightarrow k)\Sigma V\mu\}] - [\{\alpha v'\# \cdot (\mu = v+1 \rightarrow k)\Sigma III\mu\} - \{\alpha v\# \cdot (\mu = v \rightarrow k)\Sigma III\mu\}]$ (1D)

$(VE2)v = \{\alpha v'\# \cdot (\mu = v+1 \rightarrow k)\Sigma P\mu\} - \{\alpha v\# \cdot (\mu = v \rightarrow k)\Sigma P\mu\}$ (1E)

$(IIIE)v = [\{\alpha v' \cdot (\mu = v+1 \rightarrow k)\Sigma III\mu\} - \{\alpha v \cdot (\mu = v \rightarrow k)\Sigma III\mu\}] - [\{\alpha v'\# \cdot (\mu = v+1 \rightarrow k)\Sigma II\mu\} - \{\alpha v\# \cdot (\mu = v \rightarrow k)\Sigma II\mu\}]$ (1F)

$(PE)v = \{\alpha v' \cdot (\mu = v+1 \rightarrow k)\Sigma P\mu\} - \{\alpha v \cdot (\mu = v \rightarrow k)\Sigma P\mu\}$ (1G)

$(IIE)v = [\{\alpha v' \cdot (\mu = v+1 \rightarrow k)\Sigma II\mu\} - \{\alpha v \cdot (\mu = v \rightarrow k)\Sigma II\mu\}] - [\{\alpha v'\# \cdot (\mu = v+1 \rightarrow k)\Sigma I\mu\} - \{\alpha v\# \cdot (\mu = v \rightarrow k)\Sigma I\mu\}]$ (1H)

However, in order to apply the decentering aberration coefficients to the camera shake compensating optical system, it is necessary to replace the image surface IS with the object surface OS by a reversal of the optical system to use aberration coefficients from the image surface IS. That is, the image point movement amounts must be converted to those of the object surface OS. The reasons therefor will be described.

Figure 15A:
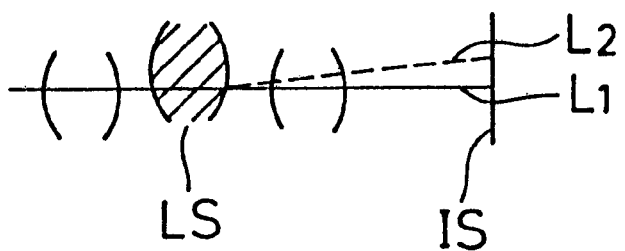
FIGS. 15A to 15B are views of assistance in explaining the difference in light beam passing position due to decentering.
Figure 15B:
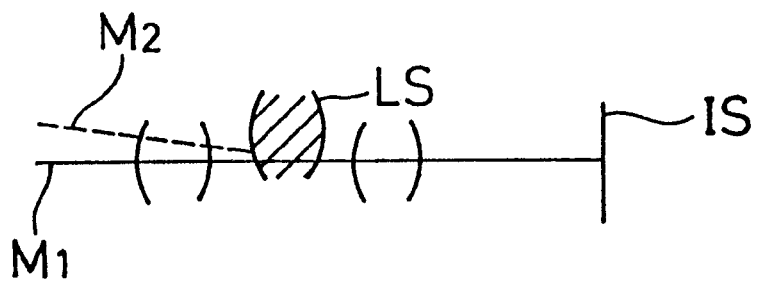

The first reason is that the light beam passing position sometimes shifts due to decentering. Referring to FIG. 15A ($L_1$ represents a light beam before decentering and $L_2$ represents a light beam after decentering), according to the above-described method of Mr. Matsui's paper, the light beam passing position on the image surface IS side of a decentering lens LS is shifted by the decentering lens LS. Consequently, the aberration coefficients of the decentering lens LS and of the decentering lens LS to the image surface IS relate to the decentering aberration coefficients. On the contrary, referring to FIG. 15B ($M_1$ represents a light beam before camera shake compensation and $M_2$ represents a light beam after camera shake compensation), in the camera shake compensating optical system (ideally), the light beam passing position on the object side of the decentering lens LS differs between before camera shake compensation and after camera shake compensation. Consequently, the aberration coefficients of the decentering lens LS and the lenses located on the object side of the decentering lens LS relate to the decentering aberration coefficients.

Figure 16:
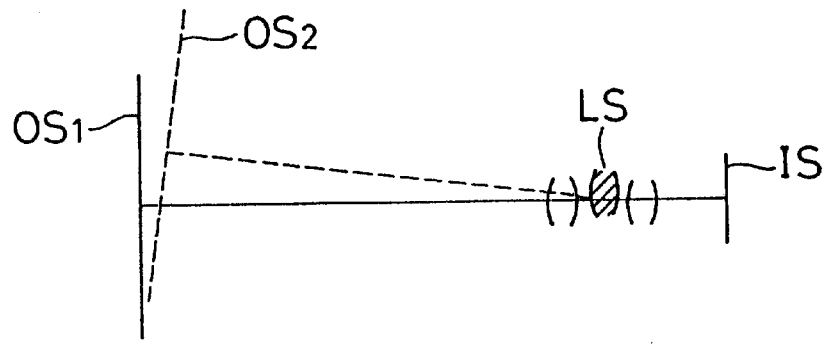
FIG. 16 is a view of assistance in explaining rotational conversion of the object surface.

The second reason is that the aberrations sometimes degrade due to a rotational conversion of the object surface. According to the above-described method of Mr. Matsui's paper, neither the object surface $OS_1$ nor the image surface IS moves, whereas in the camera shake compensating optical system, the object surface $OS_1$ rotates as shown in FIG. 16. For this reason, the off-axial image point movement error and the one-side blur are great compared to the case where the object surface does not rotate. In FIG. 16, $OS_1$ represents an object surface before camera shake compensation and $OS_2$ represents an object surface after camera shake compensation.

Figure 17:
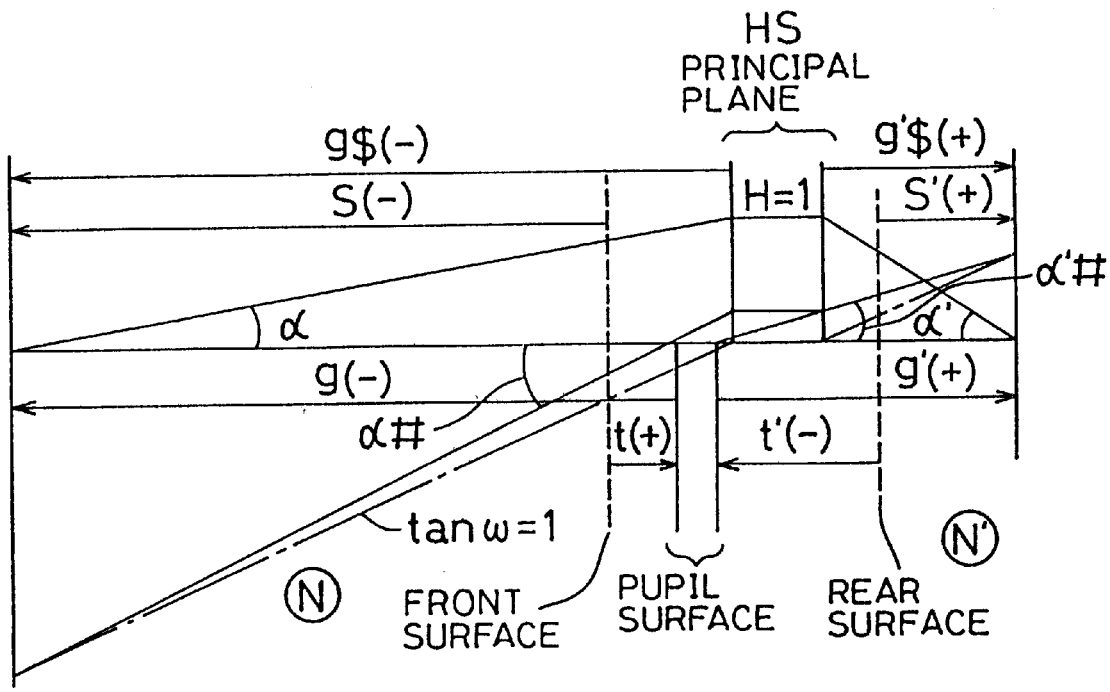
FIG. 17 is a view of assistance in explaining aberration coefficients of reversal and non-reversal optical systems.

Aberration Coefficients of Reversal Optical System and Aberration Coefficients of Non-reversal Optical System Since the image point movement amounts must be converted to those of the object surface for the above-described reasons, the coefficients of the expressions (1A) to (1H) are converted according to the following expressions (2A) to (2J) represented based on FIG. 17 (non-reversal optical system):

$^R\alpha = {^R}N/{^R}g\$ = -\alpha'$ ... (2A)

$^R\alpha\# = \alpha'\#$ ... (2B)

$^R\alpha\mu' = -\alpha v$ ... (2C)

$^R\alpha\mu'\# = \alpha v\#$ ... (2D)

$^R P\mu = Pv$ ... (2E) ... same $^R\phi\mu = \phi v$ ... (2F) ... same $^R I\mu = Iv$ ... (2G) ... same $^R II\mu = -IIv$ ... (2H) ... reverse $^R III\mu = IIIv$ ... (2I) ... same $^R V\mu = -Vv$ ... (2J) ... reverse where $^R(\ )$ represents a reversal optical system and N is a refractive index.

Decentering Aberration Coefficients and Camera Shake Aberration Coefficients when Compensating Lens Unit Parallely Decenters Since the previously-mentioned expressions (1A) to (1H) show a case where only one surface v is decentered, they are converted to expressions showing a case where a plurality of surfaces i to j are decentered. When the compensating lens unit is parallel decentered, since the decentering amounts Ei to Ej of the decentered surfaces i to j are the same, the aberration coefficients can be treated as a sum as shown in the following expression:

$(\Delta E)i$ to $j = (v = i \rightarrow j)\Sigma\{-2 \cdot (\alpha v' - \alpha v)\}$ From $\alpha v' = \alpha v + 1$, the following expression is obtained:

$(\Delta E)i$ to $j = -2 \cdot (\alpha j' - \alpha i)$

Likewise, with respect to other aberration coefficients, the terms between $\Sigma$s are deleted. For example, $$(PE)i \text{ to } j=(\mu=i\to j)\Sigma\{\alpha v'\cdot(\mu=v+1\to k)\Sigma P\mu - \alpha v\cdot(\mu=v\to k)\Sigma P\mu\}$$

$$=\alpha j'\cdot(\mu=j+1\to k)\Sigma P\mu - \alpha i\cdot(\mu=i\to k)\Sigma P\mu$$

This is further converted to $$(PE)i \text{ to } j=(\alpha j'-\alpha i)\cdot(\mu=j+1\to k)\Sigma P\mu - \alpha i\cdot(\mu=i \text{ to } j)\Sigma P\mu$$

where $(\mu=j+1\to k)\Sigma P\mu$ is the sum of P (Petzval) of the lenses arranged behind the compensating lens unit, and $(\mu=i \text{ to } j)\Sigma P\mu$ is the sum of P of the compensating lens unit.

$$(PE)i \text{ to } j=(\alpha j'-\alpha i)P_R - \alpha i \cdot P_D$$

where $(\ )_R$ is the sum of the aberration coefficients of the lenses arranged behind the compensating lens and $(\ )_D$ is the sum of the aberration coefficients of the compensating lens unit. The symbol of parentheses ( ) with a sub-script is a shorthand notation to indicate that an appropriate character or string of characters can be included in place of this mathematical notation.

As described above, by the conversion of the image point movement amounts to those of the object surface and the conversion of the expressions to the expressions showing the case where a plurality of surfaces i to j are decentered, the decentering aberration coefficients represented by the following expressions (3A) to (3F) are obtained. By re-defining the decentering aberration coefficients according to the expressions (3A) to (3F), the expressions (1A) to (1H) can be used as they are as expressions representing the image point movement amounts on the object surface.

$$(\Delta E)i \text{ to } j=-2\cdot(\alpha j'-\alpha i) \tag{3A}$$

$$(VE1)i \text{ to } j=(\alpha j'-\alpha i)\cdot V_R - (\alpha j'\#-\alpha i\#)\cdot III_R - (\alpha i\cdot V_D - \alpha i\#\cdot III_D) \tag{3B}$$

$$(VE2)i \text{ to } j=(\alpha j\#-\alpha i\#)\cdot P_R - \alpha i\#\cdot P_D \tag{3C}$$

$$(IIIE)i \text{ to } j=(\alpha j'-\alpha i)\cdot III_R - (\alpha j'\#-\alpha i\#)\cdot II_R - (\alpha i\cdot III_D - \alpha i\#\cdot II_D) \tag{3D}$$

$$(PE)i \text{ to } j=(\alpha j'-\alpha i)\cdot P_R - \alpha i\cdot P_D \tag{3E}$$

$$(IIE)i \text{ to } j=(\alpha j'-\alpha i)\cdot II_R - (\alpha j'\#-\alpha i\#)\cdot I_R - (\alpha i\cdot II_D - \alpha i\#\cdot I_D) \tag{3F}$$

Off-axial Image Point Movement Error

Subsequently, the off-axial image point movement error will be described. The decentering aberration coefficients (of the reversal optical systems) are represented by $\Delta E$, VE1, VE2, IIIE, PE and IIE. The movements of the image point (before rotational conversion on the object surface) due to decentering on the object surface are represented by the following expressions (4A) and (4B) (in the principal light beam (R=0)). The expressions (4A) and (4B) are the expressions (1A) and (1B) where R=0.

$$\Delta Y\#=-(E/2\alpha'_k)\cdot[\Delta E+(N\cdot\tan\omega)^2\cdot\{(2+\cos^2\phi\omega)VE1-VE2\}] \tag{4A}$$

$$\Delta Z\#=-(E/2\alpha')\cdot\{(N\cdot\tan\omega)^2\cdot\sin 2\phi\omega\cdot VE1\} \tag{4B}$$

Based on the expressions (4A) and (4B), the following expressions (4C) and (4D) are obtained (axial light beam, $\tan\omega=0$):

$$\Delta Y_o\#=-(E/2\alpha'_k)\cdot\Delta E \tag{4C}$$

$$\Delta Z_o\#=0 \tag{4D}$$

Subsequently, the rotational conversion will be described with reference to FIGS. 18A and 18B. From FIG. 18A, the following expression holds:

$$Y\#=g\$_k\cdot\tan\omega$$

From the sine theorem, $$Y'\#/\{\sin(\pi/2-\omega')\}=(Y\#+\Delta Y\#-\Delta Y_o\#)/\{\sin(\pi/2+\omega'-\theta)\}$$

$\Delta Y'\#$ after the rotational conversion is represented by the following expression:

$$\Delta Y'\#=(Y'\#)-(Y\#)$$

$$=[Y\#\cdot\cos\omega'+\{(\Delta Y\#)-(\Delta Y_o\#)\}\cos\omega'-Y\#\cos(\omega'-\theta)]/\cos(\omega'-\theta)$$

Only the numerators of this expression are converted.

$$[Y\#\cdot\cos\omega'+\{(\Delta Y\#)-(\Delta Y_o\#)\}\cdot\cos\omega'-Y\#\cos(\omega'-\theta)]$$

$$=Y\#\cdot\cos\omega'+\{(\Delta Y\#)-(\Delta Y_o\#)\}\cdot\cos\omega'-Y\#\cdot\cos\theta\cdot\cos\omega'-Y\#\sin\theta\cdot\sin\omega'$$

$$=(1-\cos\theta)\cdot Y\#\cdot\cos\omega'+\{(\Delta Y\#)-(\Delta Y_o\#)\}\cdot\cos\omega'-Y\#\sin\theta\cdot\sin\omega'$$

Here, since $\theta$ is small and ignorable compared to the other values, $(1-\cos\theta)=\theta^2/2$, $\sin\theta=\theta$, and $\cos\omega'/\{\cos(\omega'-\theta)\}=1$, $\sin\omega'/\{\cos(\omega'-\theta)\}=\tan\omega$.

Therefore, the following expression is obtained:

$$\Delta Y'\#=(\Delta Y\#-\Delta Y_o\#)-Y_\#\cdot\theta\cdot\tan\omega$$

$(\Delta Y\#-\Delta Y_o\#)$ represents the off-axial image point movement error of parallel decentering and $Y\#\cdot\theta\tan\omega$ is an additional term (irrelevant to the aberration coefficients) due to rotation. Since $\omega$ at this time is on an X-Y cross section, $$\Delta Y'\#=(\Delta Y\#-\Delta Y_o\#)-Y\#\cdot\tan\omega\cdot\cos\phi\omega \tag{5A}$$

Subsequently, the conversion to the image surface IS will be described with reference to FIG. 19. A magnification $\beta$ is represented by the following expression:

$$\beta=g\$_1/g\$_k=\alpha_k'/\alpha_1$$

where $\alpha_1=1/g\$_1$. The relationship between the image surface IS and the object surface OS is represented by the following expression:

$$Y=\beta\cdot Y\#$$

Y# and $\Delta Y\#$ which take the form of $/\alpha_k'\times(\ )$ are converted as follows:

$$Y=\beta\cdot Y\#$$

$$=(\alpha_k'/\alpha_1)\cdot(1/\alpha_k')\times(\ )$$

$$=g\$_1\times(\ )$$

Here, if $g\$_k'\to\infty$, $g\$_1-F1$. Therefore, the following expression holds:

$$Y=-F1\times(\ )$$

$$=-F1\times\alpha_k'\times Y_\#$$

Subsequently, the off-axial image point movement error on the image surface will be described. From the expression (4C) and $\alpha_k'=1/g_k'\$$, a decentering amount E is represented by the following expressions:

$$\theta=\Delta Y_o\#/g\$_k'=E\cdot\Delta E/2$$

$$E=2\cdot\theta/\Delta E$$

Normalization is performed so that the camera shake compensation angle $\theta$ is constant (0.7 deg=0.0122173 rad).

By performing parallel decentering (rotational decentering is not performed) to image-surface-convert $\Delta Y=(\Delta Y\#-\Delta Y_0\#)$ (here, $N\cdot\tan\omega=/F1$, $\Phi^2=Y^2+Z^2$), the following expressions (6A) to (6D) are obtained:

$$\Delta Y=(\theta\cdot\Phi^2/F1)\cdot[\{2+\cos 2\cdot\phi\omega)\cdot VE1-VE2\}/\Delta E] \quad (6A)$$

$$\Delta Z=(\theta\cdot\Phi^2/F1)\cdot[\{(\sin 2\cdot\phi\omega)\cdot VE1-VE2\}/\Delta E] \quad (6B)$$

$Y_+$ image point, $Y_-$ image point $\{\phi\omega=0, \pi$ of the expressions (6A) and (6B)$\}$:

$$\Delta Y_Y=(\theta\cdot Y^2/F1)\cdot\{(3\cdot VE1-VE2)/\Delta E\} \quad (6C)$$

Z image point $\{\phi\omega=\pi/2$ of the expressions (6A) and (6B)$\}$ $$\Delta Y_{Z=(\theta\cdot Z^2/F1)\cdot\{(VE1-VE2)/\Delta E\}} \quad (6D)$$

Then, rotational conversion is performed. Since $Y\#=-Y/(F1\times\alpha_k')$, with respect to $-Y\#\cdot\theta\cdot\tan\omega\cdot\cos\phi\omega$ of the expression (5A), the following expression holds:

$$-Y\#\cdot\theta\cdot\tan\omega\cdot\cos\phi\omega=Y/(F1\times\alpha_k')\cdot\theta\cdot\tan\omega\cdot\cos\phi\omega$$

At the $Y_+$ image point and the $Y_-$ image point, since $\phi\omega=0, \pi$ and $\tan\omega/\alpha_k'=Y$, $-Y\#\cdot\theta\cdot\tan\omega\cdot\cos\phi\omega$ on the image surface is $-Y\#\cdot\theta\cdot\tan\omega\cdot\cos\phi\omega=Y^2\cdot\theta/F1$. By adding this to the expression (6C), the following expression (6E) is obtained. At the Z image point, since $\phi\omega=\pi/2$, $-Y\#\cdot\theta\cdot\tan\omega\cdot\cos\phi\omega$ on the image surface is $-Y\#\cdot\theta\cdot\tan\omega\cdot\cos\phi\omega=0$. By adding this to the expression (6D), the following expression (6F) is obtained:

$$\Delta Y_Y'=(\theta\cdot Y^2/F1)\cdot\{(3\cdot VE1-VE2-\Delta E)/\Delta E\} \quad (6E)$$

$$\Delta Y_Z'=\Delta Y_Z \quad (6F)$$

One-side Blur

Subsequently, the one-side blur will be described. From the expressions (1A) and (1B), $\Delta M$ is $\{$(primary term of R) of $\Delta Y$ $\phi R=0\}\times g\$_k'$ and $\Delta S$ is $\{$(primary term of R) of $\Delta Z$ $\phi R=\pi/2\}\times g\$_k'$. Before rotation, the following expression holds on the object surface OS (here, $\alpha_k'=N_k'/g\$_k'$ and $E/2=\theta/\Delta E$ are used):

$$\Delta M\#=(-g\$_k'^2\cdot\theta/N_k')\times 2\cdot R\cdot(N\cdot\tan\omega)\cdot\cos\phi\omega\cdot\{(3\cdot IIIE+PE)/\Delta E\}$$

After the rotation, the following expression holds:

$$\Delta M'\#\approx\Delta M\#+\theta Y\#$$

By converting the aberration coefficients to those on the image surface and substituting $N_k'=1$ and $N=1$, the following expression is obtained:

$$\Delta M'=\beta^2\cdot\alpha M'\#$$

$$=-g\$_1{}^2\cdot\theta\times 2\cdot R\cdot\tan\omega\cdot\cos\phi\omega\cdot\{(3\cdot IIIE+PE)/\Delta E\}+\beta\cdot Y\cdot\theta$$

If the object surface OS is $\infty$ (here, $g\$,=-F1$, $\beta\to 0$, $\tan\omega=Y/F1$ and $\phi\omega=0$), the following expression (7A) representative of a meridional one-side blur $\Delta M'$ is obtained. Likewise, an expression (7B) representative of a sagittal one-side blur is obtained.

$$\Delta M'=-2\cdot F1\cdot Y\cdot\theta\cdot R\cdot\{(3\cdot IIIE+PE)/\Delta E\} \quad (7A)$$

$$\Delta S'=-2\cdot F1\cdot Y\cdot\theta\cdot R\cdot\{(IIIE+PE)/\Delta E\} \quad (7B)$$

Axial Coma

Subsequently, axial coma will be described. Based on the expression (1A), coma by $\omega=0$ and upper decentering is represented by the following expression:

$$\Delta Y_{Upper}\#=\Delta Y\#(\omega=0, \phi_R=0)-\Delta Y\#(\omega=0, R=0)$$

$$=-E/(2\cdot\alpha')\times R^2\times 3\cdot IIE$$

Coma by $\omega=0$ and lower decentering (the same as $\Delta Y_{Upper}\#$ including the sign) is represented by the following expression:

$$\Delta Y_{Lower}\#=\Delta Y_\#(\omega=0, \phi_R=\pi)-\Delta Y\#(\omega=0, R=0)$$

$$=-E/(2\cdot\alpha')\times R^2\times 3\cdot IIE$$

Since $\omega=0$, axial coma is hardly varied by the rotational conversion. By the conversion from the object surface OS to the image surface IS ($\Delta Y=\beta\cdot\Delta Y\#$, $E/2=\theta/\Delta E$), the following expression is obtained $$\Delta Y_{Upper}=F1\times\theta\times R^2\times(3\cdot IIE/\Delta E)=\Delta Y_{Lower}$$

The axial coma AXCM is represented by the following expression (8A):

$$AXCM=(\Delta Y_{Upper}+\Delta Y_{Lower})/2$$

$$=\Delta Y_{Upper} \quad (8A)$$

A part of each of the expressions (6E), (6F), (7A), (7B) and (8A) is newly defined as an aberration coefficient represented by the following expressions (9A) to (9E):

Off-axial image point movement error of the image point on the Y-axis ... $VE_Y=\{(3\cdot VE1-VE2-\Delta E)/\Delta E\}$ (9A)

Off-axial image point movement error of the image point on the Z-axis ... $VE_Z=\{(VE1-VE2)/\Delta E\}$ (9B)

Marginal one-side blur ... $IIIE_M=\{(3\cdot IIIE+PE)/\Delta E\}$ (9C)

Sagittal one-side blur ... $IIIE_S=\{(IIIE+PE)/\Delta E\}$ (9D)

Axial coma ... $IIE_A\{(3\cdot IIE)/\Delta E\}$ (9E)

By substituting the expressions (3A) to (3F) in the expressions (9A) to (9B) representative of the camera shake aberration coefficients, the following expressions (10A) to (10E) representative of camera shake aberration coefficients are obtained:

$$VE_Y=-\tfrac{1}{2}\cdot\{3V_R-3V_D\cdot A+^2-(3\cdot III_R+P_R)\cdot H\#+(3\cdot III_D+P_D)\cdot A\#\} \quad (10A)$$

$$VE_Z=-\tfrac{1}{2}\cdot\{V_R-V_D\cdot A-(III_R+P_R)\cdot H\#+(III_D+P_D)\cdot A\#\} \quad (10B)$$

$$IIIE_M=-\tfrac{1}{2}\cdot\{(3\cdot III_R+P_R)-(3\cdot III_D+P_D)\cdot A-3\cdot II_R H\#+3\cdot II_D\cdot A\#\} \quad (10C)$$

$$IIIE_S=-\tfrac{1}{2}\cdot\{(III_R+P_R)-(III_D+P_D)\cdot A-II_R\cdot H\#+II_D\cdot A\#\} \quad (10D)$$

$$IIE_A=-3/2\cdot(II_R+II_D\cdot A-I_R\cdot H\#+I_D\cdot A\#) \quad (10E)$$

where $(\ )_D$ is the sum of the aberration coefficients of the compensating lens unit;

$(\ )_R$ is the sum of the aberration coefficients of the lens units arranged behind (on the object side of) the compensating lens unit;

$A=\alpha i/(\alpha j'-\alpha i)$ (here, the compensating lens units are i to j), $A\#=\alpha i\#/(\alpha j'-\alpha i)$; and $H\#=(\alpha i'\#-\alpha i\#)/(\alpha j'-\alpha i)$.

$\Delta E=-2\cdot(\alpha j'-\alpha i)$ (here, $(\alpha j'-\alpha i)$ is $\pm 0.0122173$ when 0.70°/mm) which is the coefficient of (camera shake compensation angle)/(decentering amount) aims substantially at a predetermined value (however, the sign differs according to whether the compensating lens units are positive or negative). Therefore, A is an incident angle of a marginal light beam to the compensating lens units (viewed from the image side) and A# is proportional to the incident angle of the principal light beam. When h# and h do not vary so much in the compensating lens units, H# represents a ratio between h# of the principal light beam and h of the marginal light beam.

Since the decentering aberration coefficients in the expressions (10A) to (10E) are defined as those of the reversal optical system, it is necessary to return them to the coefficients of the non-reversal optical system. Returning the coefficients in the expressions (10A) to (10E) by using the expressions (2A) to (2J), the following expressions (11A) to (11E) are obtained:

$$VE_Y = +\frac{1}{2} \cdot \{3V_F - 3V_D \cdot A - 2 + (3 \cdot III_F + P_F)H\# - (3 \cdot III_D + P_D) \cdot A\#\} \quad (11A)$$

$$VE_Z = +\frac{1}{2} \cdot \{V_F - V_D \cdot A + (III_F + P_F)H\# - (III_D + P_D) \cdot A_\#\} \quad (11B)$$

$$IIIE_M = -\frac{1}{2} \cdot \{(3 \cdot III_F + P_F) - (3 \cdot III_D + P_D) \cdot A + 3 \cdot II_F \cdot H\# - 3 \cdot II_D \cdot A\#\} \quad (11C)$$

$$IIIE_S = -\frac{1}{2} \cdot \{(III_F + P_F) - (III_D + P_D) \cdot A + II_F \cdot H\# II_D \cdot A\#\} \quad (11D)$$

$$IIE_A = +3/2 \cdot (II_F - II_D \cdot A + I_F \cdot H\# - I_D \cdot A_\#) \quad (11E)$$

where $(\ )_D$ is the sum of the aberration coefficients of the compensating lens units and the reversal optical system;

$(\ )_F$ is the sum of the aberration coefficients of the lens units arranged in front of the compensating lens units;

$A = -\alpha n'/(\alpha n' - \alpha m)$;

$A\# = \alpha n'\#/(\alpha n - \alpha m)$;

$H = -(\alpha n\# - \alpha m\#)/(\alpha n' - \alpha m) = -(\Sigma h\mu \# \cdot \phi\mu)/(\Sigma h\mu \cdot \phi\mu)$; and $\Delta E = -2(\alpha n' - \alpha m)$ (compensating lens units: $m \rightarrow n$, non-reversal lens system: $j \leftarrow i$).

From the expressions (11A) to (11E), the following are understood: First, as described previously, while the decentered lens unit and the lens units arranged therebehind relate to the performance according to the method of Mr. Matsui's paper, the decentered lens unit and the lens units arranged therebefore relate to the performance in the expressions (11A) to (11E). Secondly, the off-axial image point movement error tends to increase in wide angle optical systems (the focal length F1 of the compensating lens unit is the denominator) and one-side blur and axial coma tend to increase in telephoto optical systems.

Thirdly, although the degradation of aberrations due to decentering decreases by reducing the aberration coefficients of the decentered lens unit and the lens units arranged there-before, a constant (−2 in { } of the expression (11A)) remains in the coefficient $VE_Y$ of the off-axial image point movement error $\Delta Y_Y'$. This is a term generated since the object surface OS and the image surface IS incline relative to each other due to rotational camera shake. The off-axial image point movement error due to the constant term (−2) is remarkably great in wide angle optical systems. For example, the off-axial image point movement error $\Delta Y_Y' = -72 \mu m$ at a focal length F1 of 38 mm, which is not ignorable. The off-axial image point movement error due to the constant term (−2) remains even if the aberration coefficients are 0. Therefore, it is preferable to set the aberration coefficients so that the constant term (−2) is canceled. The condition (3) is a condition therefor.

Fourthly, in order to reduce the aberration degradation due to decentering, it is necessary to reduce the aberration coefficients and the coefficients such as A, A# and H# multiplied by the aberration coefficients. With respect to A and A#, the denominator $\alpha_n' - \alpha_m$ is reduced. However, since this is directly connected to $\Delta E = -2(\alpha_n' - \alpha_m)$, if it is too great, the camera shake compensation sensitivity (how many degrees the luminous flux is bent at when the lens is decentered by predetermined millimeters) is too high, so that a mechanical driving accuracy is necessary. With respect to H#, the closer the compensating lens unit is to the aperture stop, the smaller h# of each surface is, so that H# is also small.

Numerical data of the first and second embodiments of the present invention are shown in Tables 1 and 2. In the tables, ri (i=1,2,3, . . . ) represents a radius of curvature of an ith surface from the object side, di (i=1,2,3, . . . ) represents an ith axial distance from the object side (here, the axial distances of the camera shake compensating lens before decentering are shown), Ni (i=1,2,3, . . . ) and vi (i=1,2,3, . . . ) represent a refractive index and an Abbe number to the d-line of an ith lens element from the object side, respectively. f represents the focal length of the entire lens system. FNo. represents the F-number.

In the tables, the surfaces marked with asterisks are aspherical and defined by the following expression representative of the configuration of an aspherical surface:

$$X = \frac{C \cdot Y^2}{1 + (1 - \varepsilon \cdot Y^2 \cdot C^2)^{\frac{1}{2}}} + \sum_i A_i Y^i$$

where X is an amount of displacement from the reference surface along the optical axis, Y is a height in a direction vertical to the optical axis, C is a paraxial curvature, $\varepsilon$ is a conic constant, and Ai is an ith aspherical coefficient.

Figure 2:
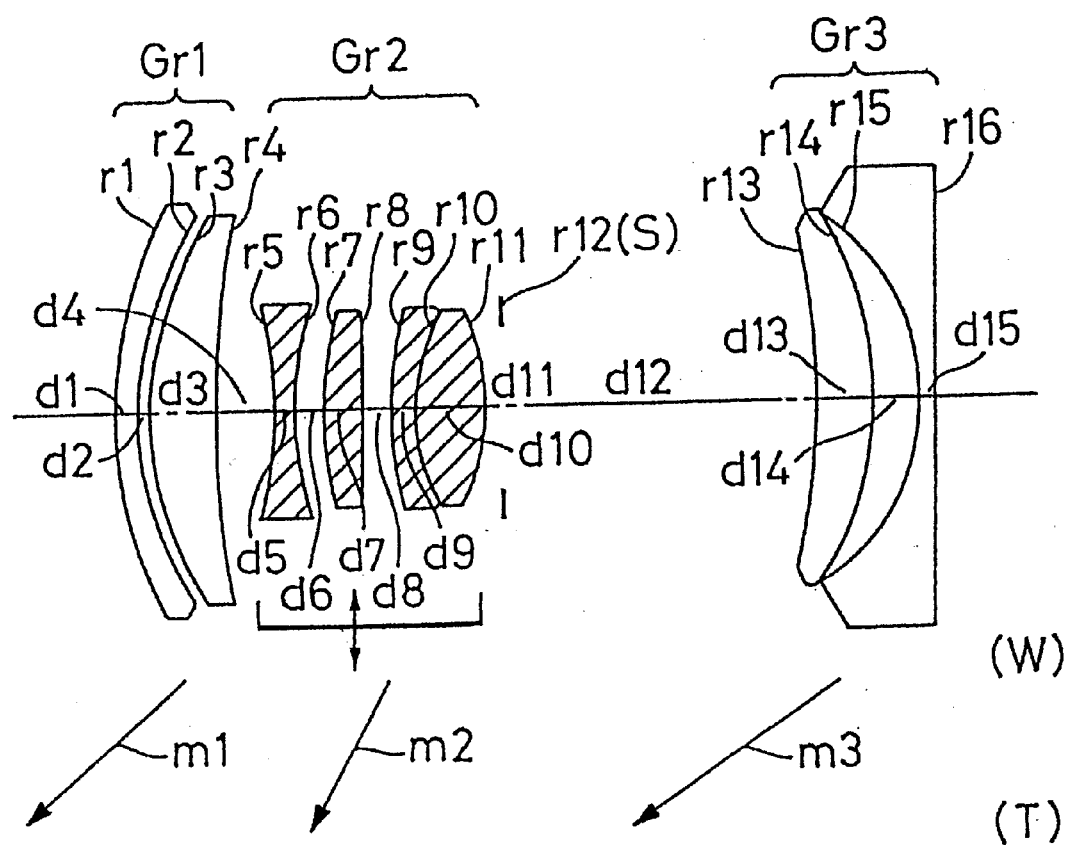
FIG. 2 shows the lens arrangement of a second embodiment of the present invention.
Figure 3A:
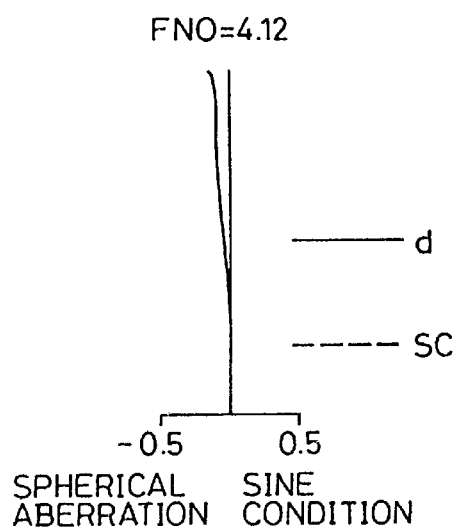
FIGS. 3A to 3F show longitudinal aberrations of the first embodiment before centering.
Figure 3B:
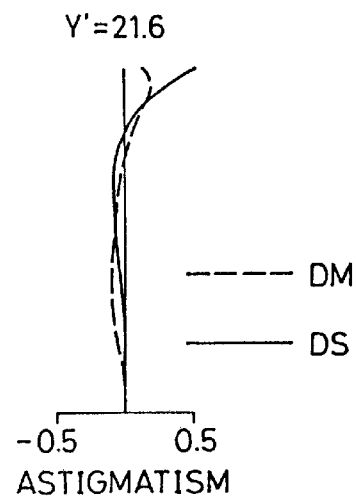
Figure 3C:
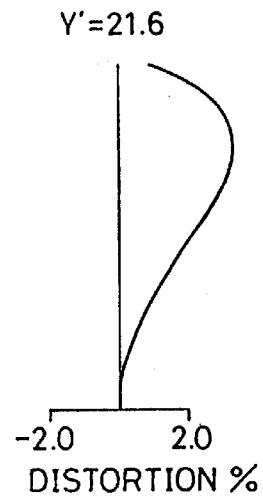
Figure 3D:
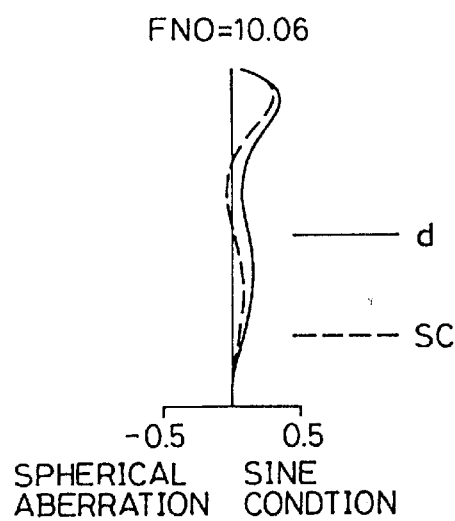
Figure 3E:
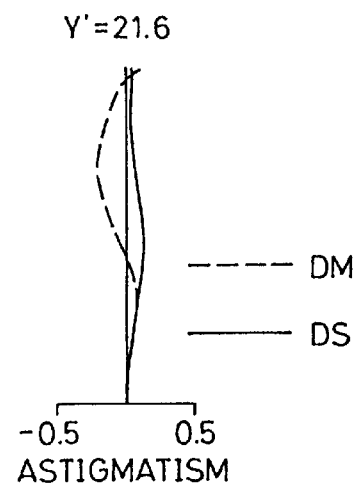
Figure 3F:
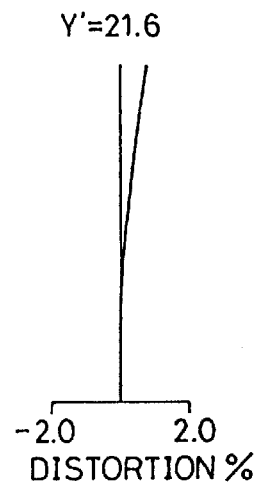
Figure 4A:
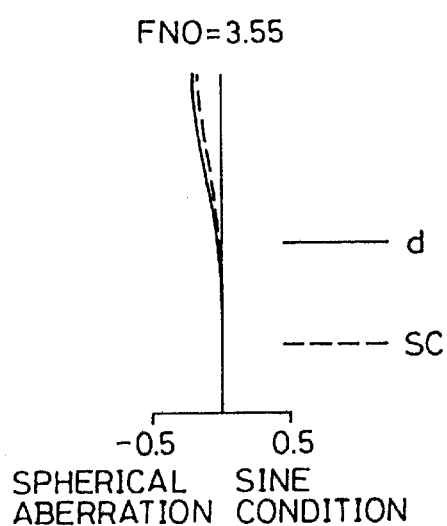
FIGS. 4A to 4F show longitudinal aberrations of the second embodiment before decentering.
Figure 4B:
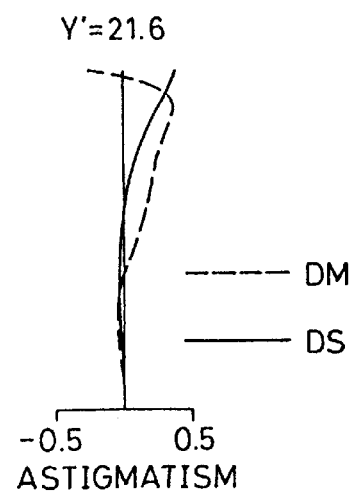
Figure 4C:
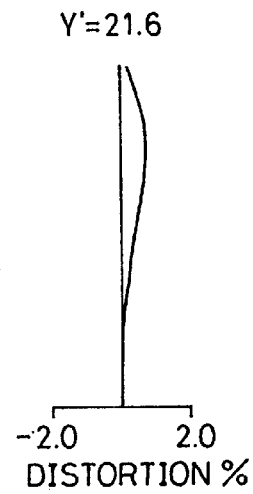
Figure 4D:
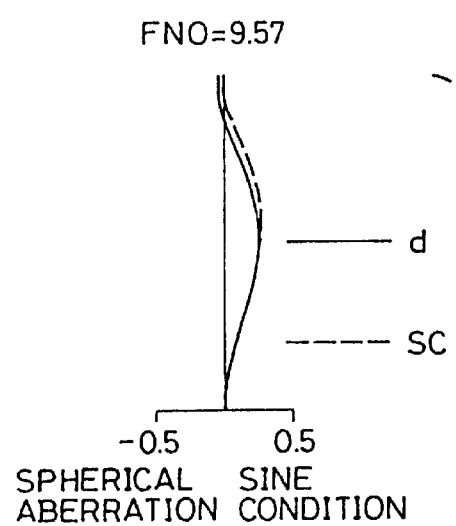
Figure 4E:
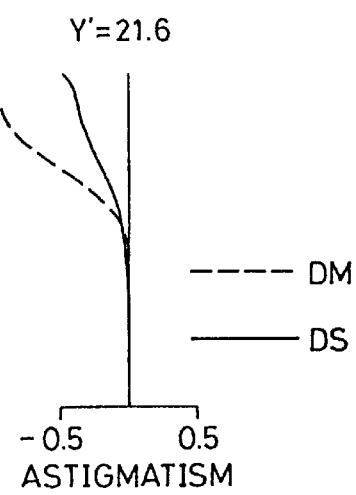
Figure 4F:
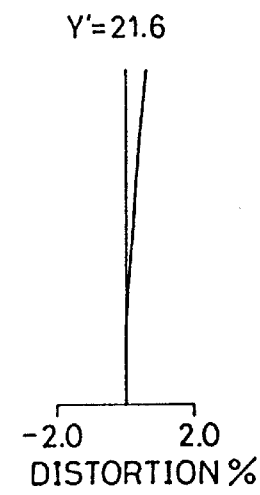
Figure 5A:
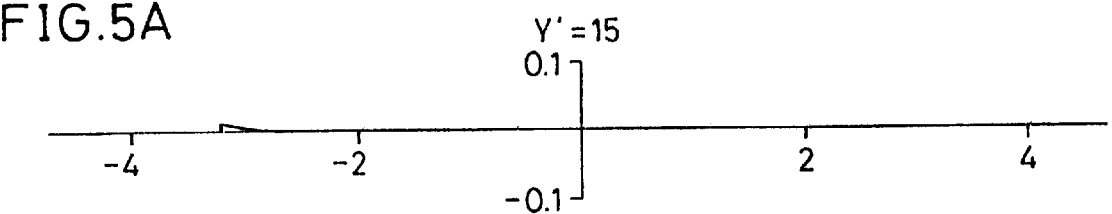
Figure 5B:
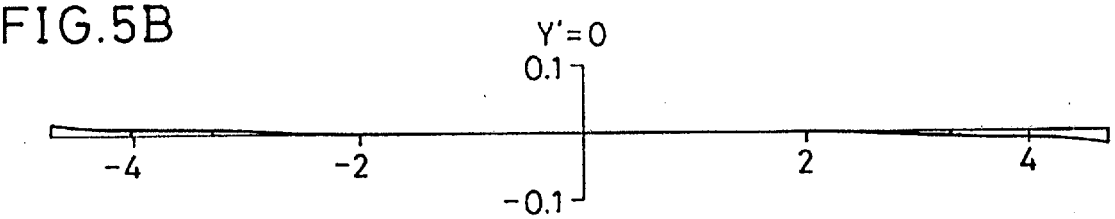
Figure 5C:
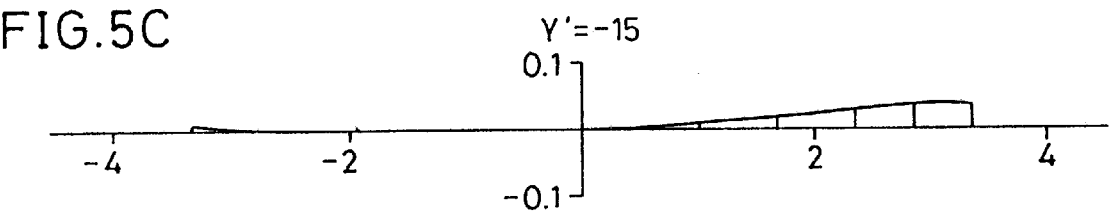
FIGS. 5C to 5E show meridional lateral aberrations of the first embodiment the shortest focal length condition after decentering.
Figure 5D:
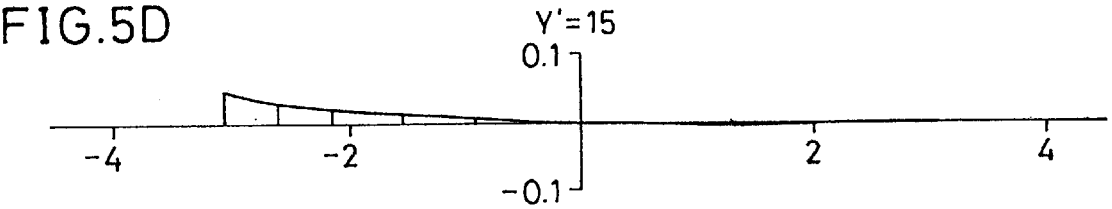
Figure 5E:
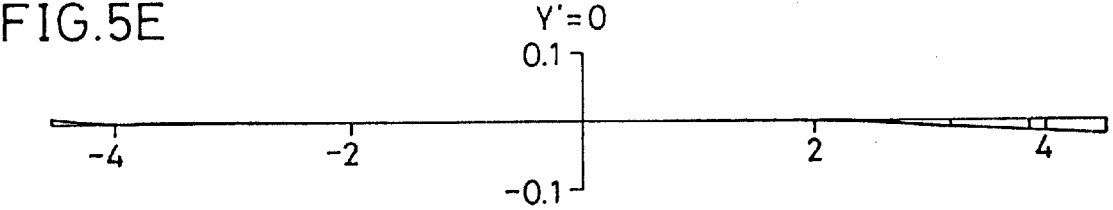
Figure 6A:
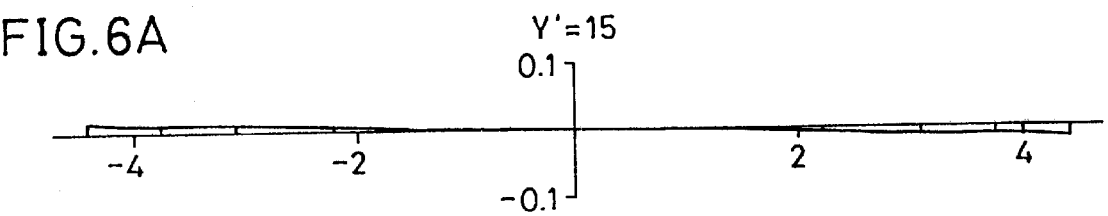
FIGS. 6A to 6B show sagittal lateral aberrations of the first embodiment at the shortest focal length condition before decentering.
Figure 6B:
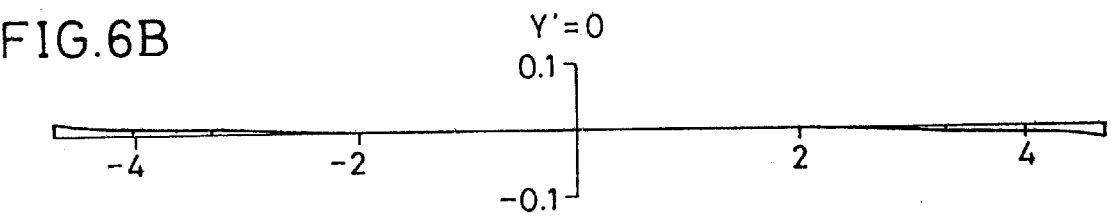
Figure 6C:
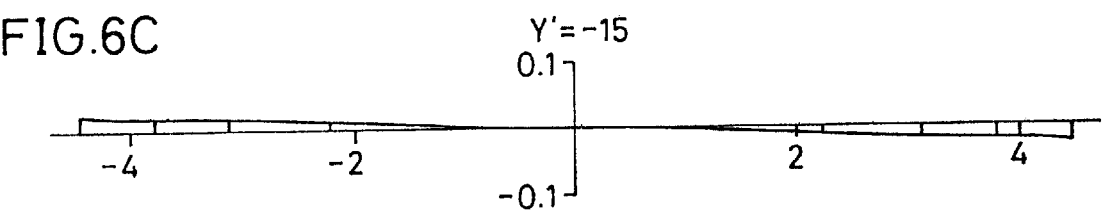
FIGS. 6C to 6E show sagittal lateral aberrations of the first embodiment at the shortest focal length condition after decentering.
Figure 6D:
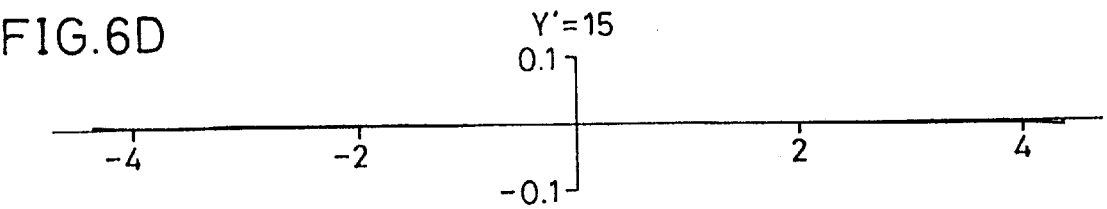
Figure 6E:
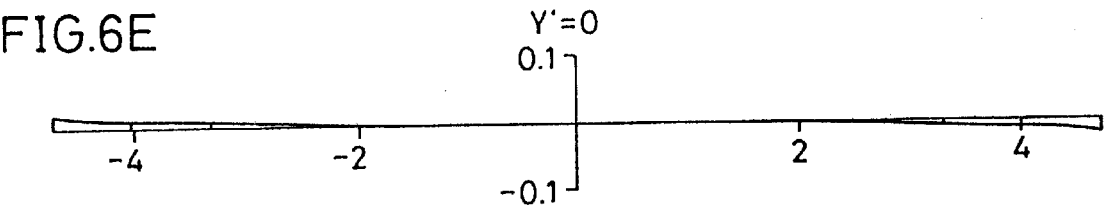
Figure 7A:
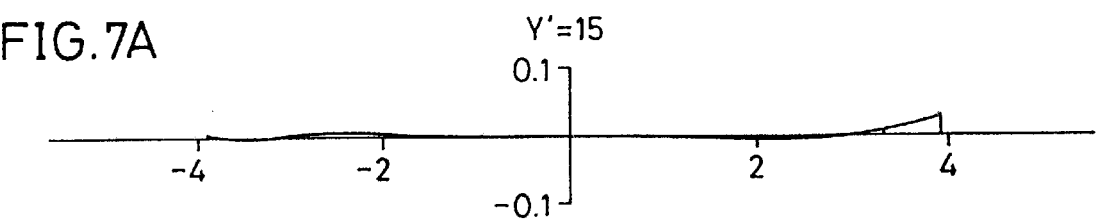
FIGS. 7A to 7B show meridional lateral aberrations of the first embodiment at the longest focal length condition before decentering.
Figure 7B:
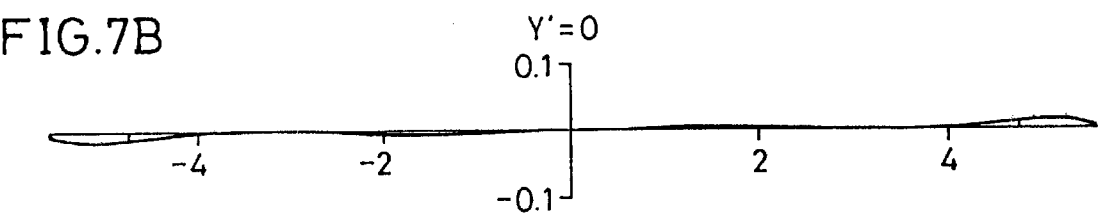
Figure 7C:
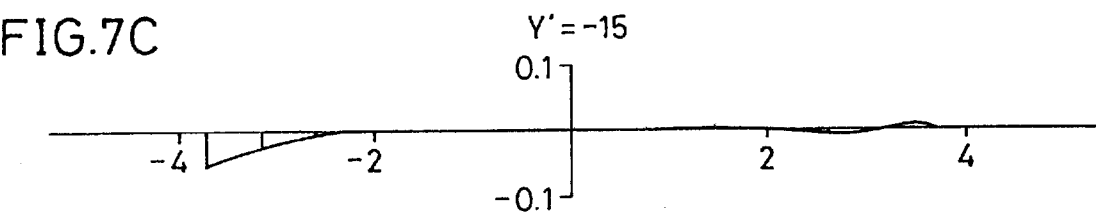
FIGS. 7C to 7E show meridional lateral aberrations of the first embodiment at the longest focal length condition after decentering.
Figure 7D:
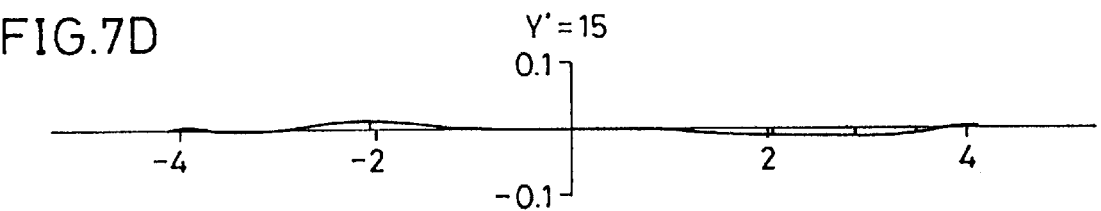
Figure 7E:
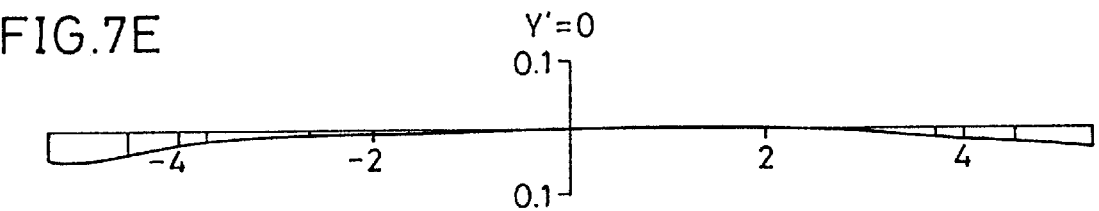
Figure 8A:
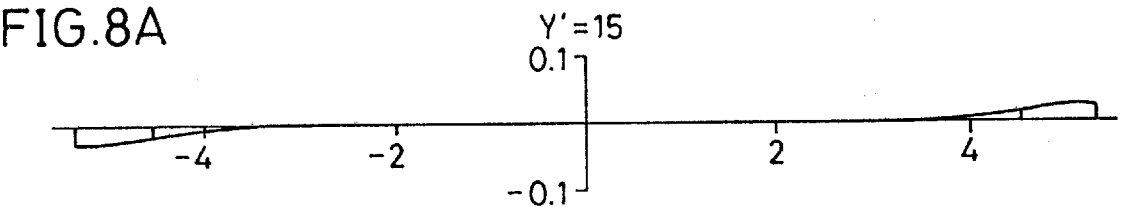
FIGS. 8A to 8B show sagittal lateral aberrations of the first embodiment at the longest focal length condition before decentering.
Figure 8B:
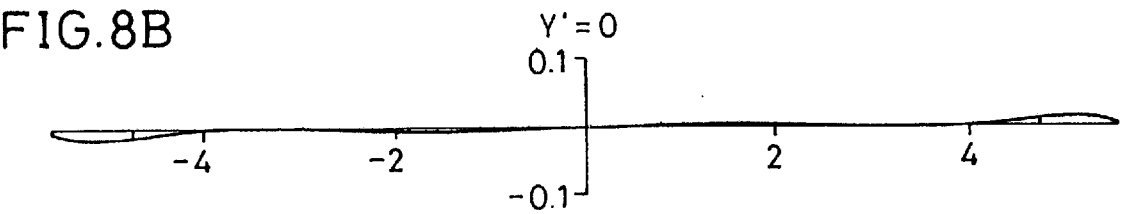
Figure 8C:
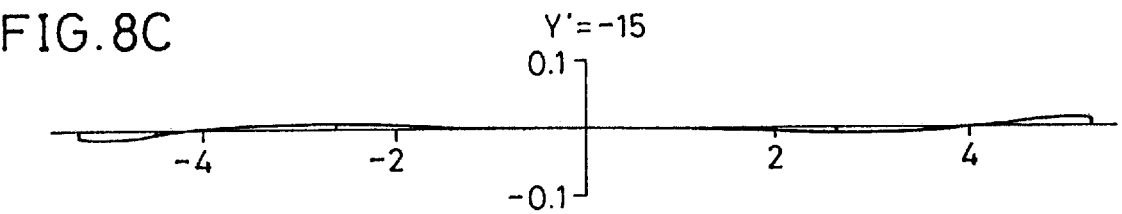
FIGS. 8C to 8E show sagittal lateral aberrations of the first embodiment at the longest focal length condition after decentering.
Figure 8D:
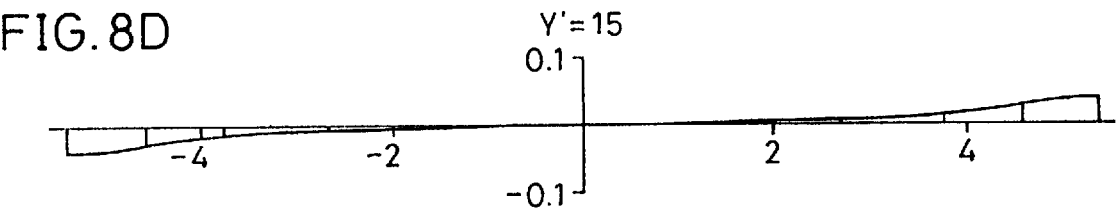
Figure 8E:
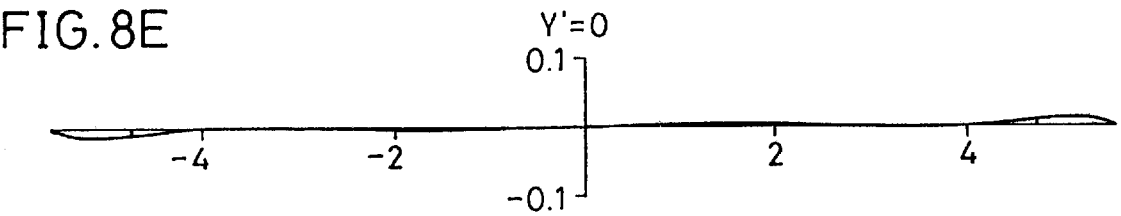
Figure 9A:
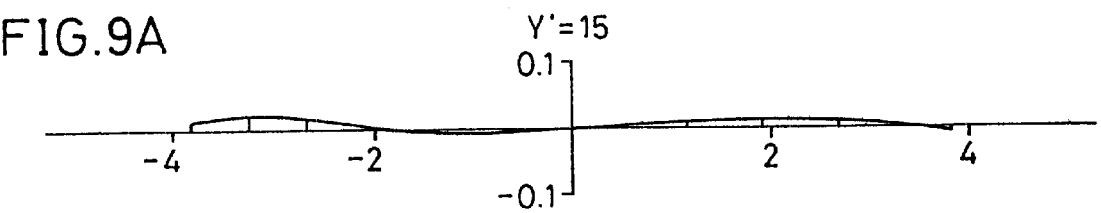
FIGS. 9A to 9B show meridional lateral aberrations of the second embodiment at the shortest focal length condition before decentering.
Figure 9B:
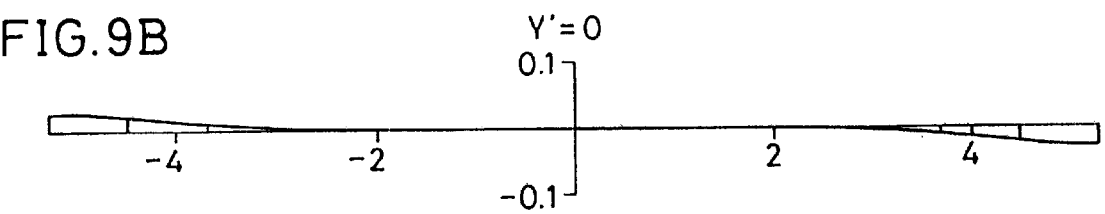
Figure 9C:
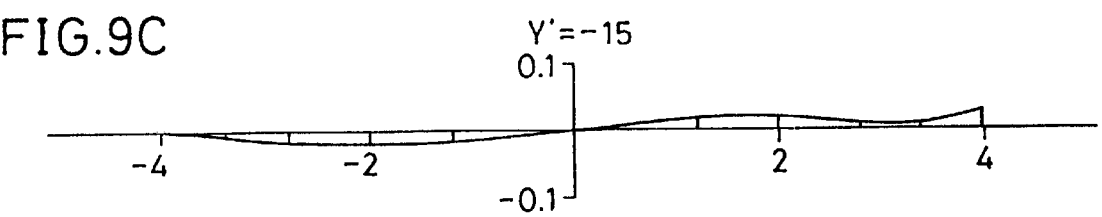
FIGS. 9C to 9E show meridional lateral aberrations of the second embodiment at the shortest focal length condition after decentering.
Figure 9D:
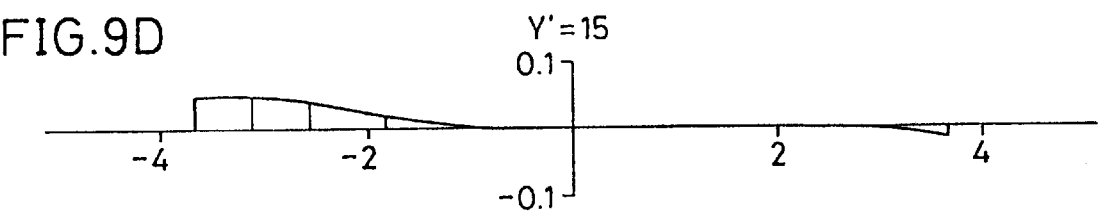
Figure 9E:
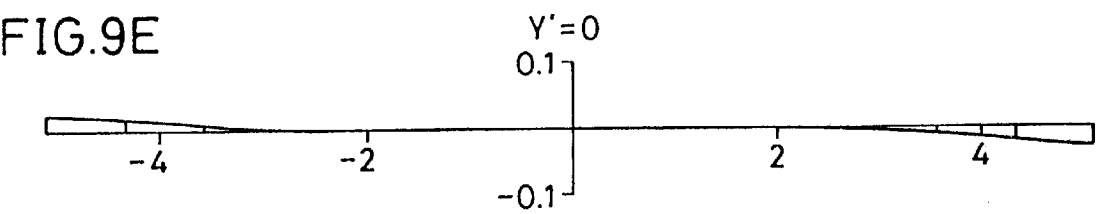
Figure 10A:
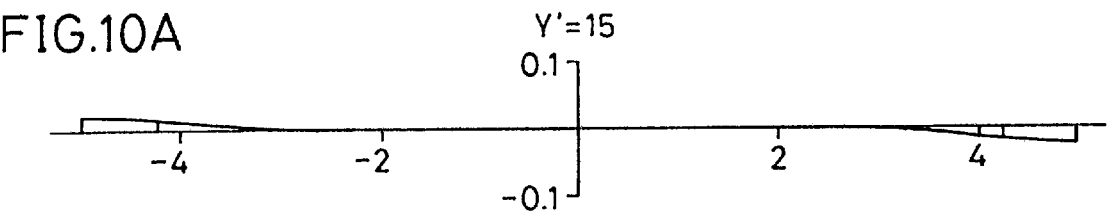
FIGS. 10A to 10B show sagittal lateral aberrations of the second embodiment at the shortest focal length condition before decentering.
Figure 10B:
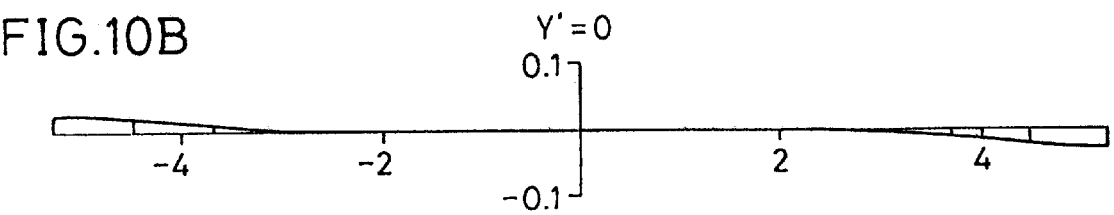
Figure 10C:
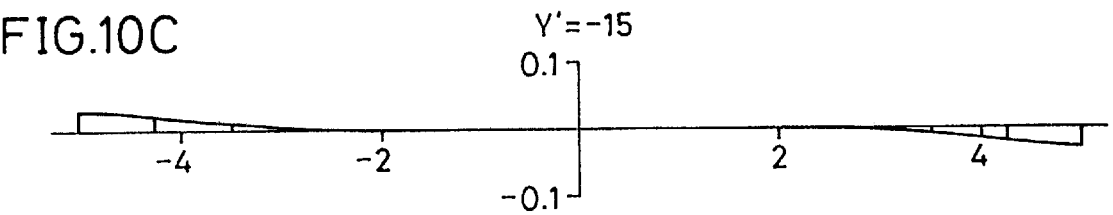
FIGS. 10C to 10E show sagittal lateral aberrations of the second embodiment at the shortest focal length condition after decentering.
Figure 10D:
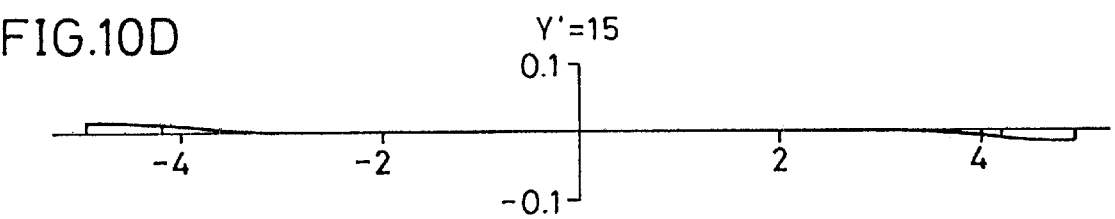
Figure 10E:
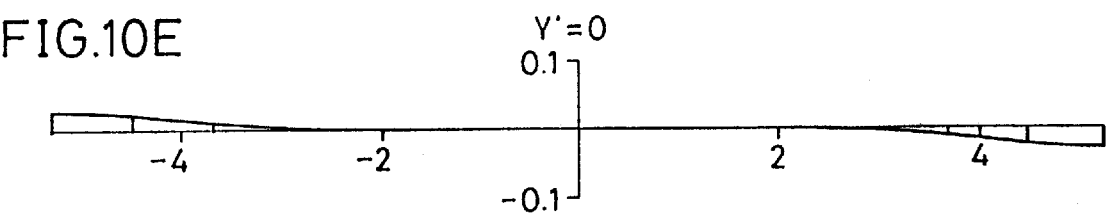
Figure 11A:
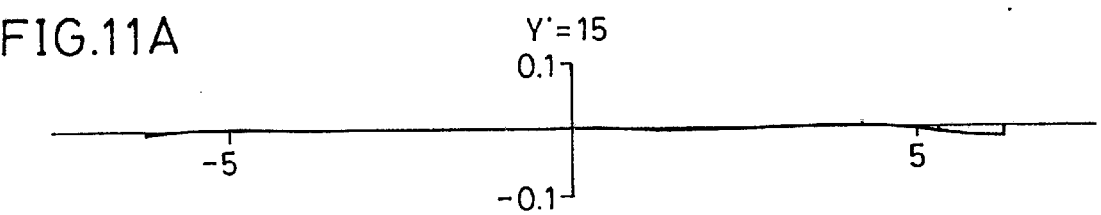
FIGS. 11A to 11B show meridional lateral aberrations of the second embodiment at the longest focal length condition before decentering.
Figure 11B:
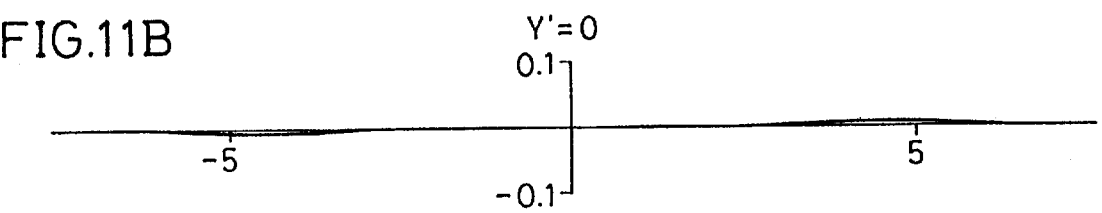
Figure 11C:
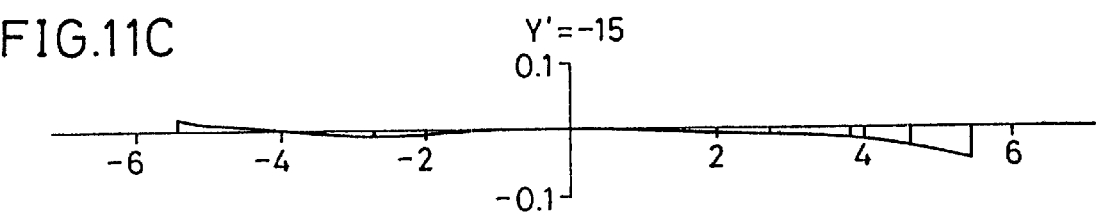
FIGS. 11C to 11E show meridional lateral aberrations of the second embodiment at the longest focal length condition after decentering.
Figure 11D:
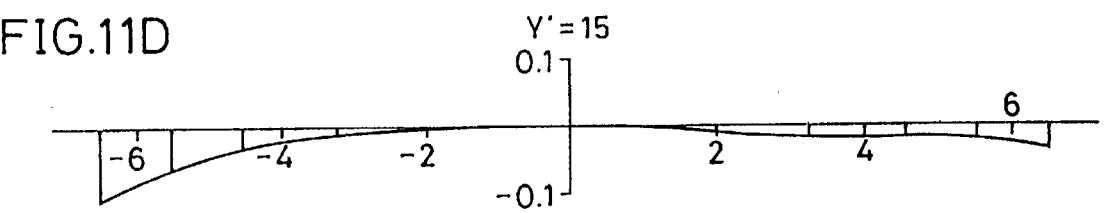
Figure 11E:
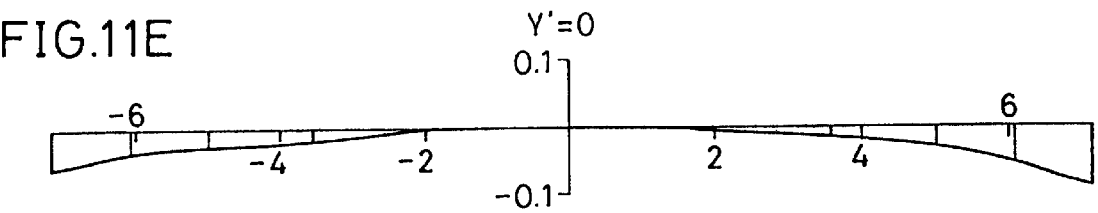
Figure 12A:
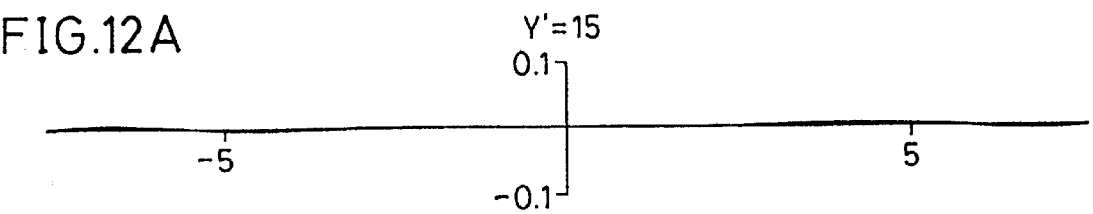
FIGS. 12A to 12B show sagittal lateral aberrations of the second embodiment at the longest focal length condition before decentering.
Figure 12B:
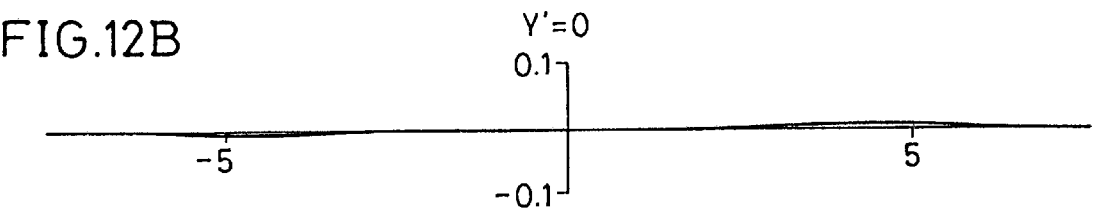
Figure 12C:
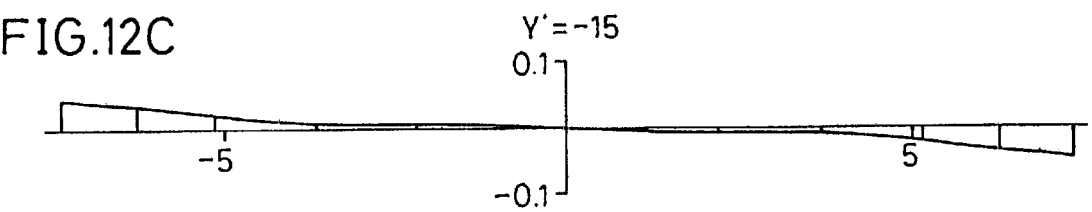
FIGS. 12C to 12E show sagittal lateral aberrations of the second embodiment at the longest focal length condition after decentering.
Figure 12D:
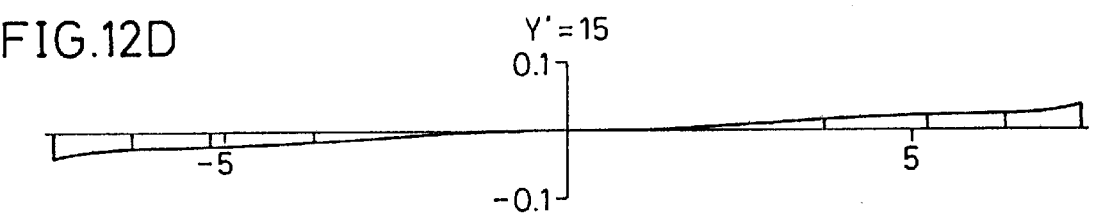
Figure 12E:
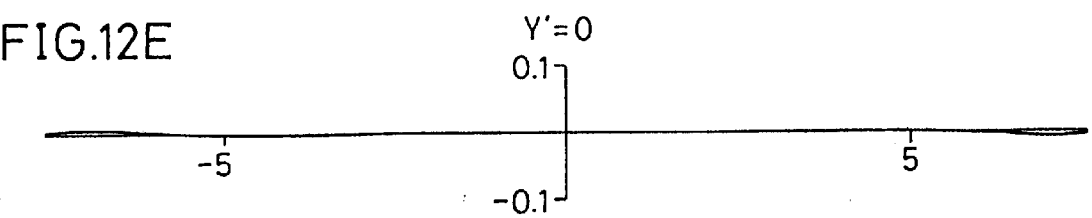

FIGS. 1 and 2 respectively show the lens arrangements of the first and second embodiments at the shortest focal length condition (W). Arrows m1, m2 and m3 schematically show the movements of a first lens unit Gr1, a second lens unit Gr2 and an aperture stop S, and a third lens unit Gr3 from the shortest focal length condition (W) to the longest focal length condition (T).

The first embodiment comprises from the object side: a first lens unit Gr1 including a negative meniscus lens element concave to the object side and a positive bi-convex lens element; a second lens unit Gr2 (hatched portion) including a negative meniscus lens element (negative front lens unit) concave to the image side and a positive meniscus lens element (positive rear lens unit) convex to the image side; an aperture stop S; and a third lens unit Gr3 including a positive meniscus lens element convex to the image side and a negative meniscus lens element concave to the object side. The following surfaces are aspherical: both side surfaces of the negative meniscus lens element of the second lens unit Gr2; and both side surfaces of the positive meniscus lens element of the third lens unit Gr3.

The second embodiment comprises from the object side: a first lens unit Gr1 including a negative meniscus lens element concave to the image side and a positive meniscus lens element convex to the object side; a second lens unit Gr2 (hatched portion) including a negative front lens unit including a negative bi-concave lens element and a positive bi-convex lens element, and a doublet lens element (positive rear lens unit) consisting of a negative meniscus lens element concave to the image side and a bi-convex lens element; and aperture stop S; and a third lens unit Gr3 including a positive meniscus lens element convex to the image side and a negative meniscus lens element concave to the object side. The following surfaces are aspherical: both side surfaces of the biconcave lens element of the second lens unit Gr2; the image side surface of the doublet lens element of the second lens unit Gr2; and both side surfaces of the positive meniscus lens element of the third lens unit Gr3.

FIGS. 3A to 3F and 4A to 4F show longitudinal aberrations of the first and second embodiments in the standard condition (pre-decentering condition) at the shortest focal length condition (W) (FIGS. 3A to 3C and 4A to 4C) and at the longest focal length condition (T) (FIGS. 3D to 3F and 4D to 4F). The solid lines d represents aberration to the d-line. The broken line SC represents sine condition. The broken line DM and the solid line DS represent astigmatism on the meridional image plane and astigmatism on the sagittal image plane, respectively.

FIGS. 5A to 5E through 8A to 8E show lateral aberrations of the second lens unit Gr2 of the first embodiment before decentering (FIGS. 5A, 5B, 6A, 6B, 7A, 7B, 8A and 8B) and after decentering (FIGS. 5C to 5E, 6C to 6E, 7C to 7E and 8C to 8E). FIGS. 9A to 9E through 12A to 12E show lateral aberrations of the second lens unit Gr2 of the second embodiment before decentering (FIGS. 9A, 9B, 10A, 10B, 11A, 11B, 12A and 12B) and after decentering (FIGS. 9C to 9E, 10C to 10E, 11C to 11E and 12C to 12E). FIGS. 5C to 5E, 6C to 6E, 7C to 7E, 8C to 8E, 9C to 9E, 10C to 10E, 11C to 11E and 12C to 12E show aberrations in a condition where compensation is made at a camera shake compensation angle θ=0.7 deg. (=0.0122173 rad). FIGS. 5A to 5E, 6A to 6E, 9A to 9E and 10A to 10E show lateral aberrations at the shortest focal length condition (W). FIGS. 7A to 7E, 8A to 8E, 11A to 11E and 12A to 12E show lateral aberrations at the longest focal length condition (T). FIGS. 5A to 5E, 7A to 7E, 9A to 9E and 11A to 11E show lateral aberrations with respect to a luminous flux on the meridional image plane. FIGS. 6A to 6E, 8A to 8E, 10A to 10E and 12A to 12E show lateral aberrations with respect to a luminous flux on the sagittal image plane. The symbol Y' represents an image height or an imaging position on the image plane with respect to a zero point that is situated on the intersection between an optical axis and the image plane. The value of Y' in the respective figures throughout the specification is explanatory of the aberrations to a person of skill in this field.

Table 3 shows values corresponding to the conditions (1) to (3) with respect to the first and second embodiments. Table 4 shows aberration degradation (i.e. error amounts in a parallel decentered condition) of the first and second embodiments in camera shake compensation at the shortest focal length condition (W) and at the longest focal length condition (T).

Thus, in the embodiments of the present invention, although the magnification is as high as 3 to 4×, the aberration degradation is small in the entire zoom range from the shortest to the longest focal length conditions even if the compensating lens unit is decentered for camera shake compensation. In addition, the embodiments of the present invention are suitable for use in lens shutter cameras since they are compact.

As described above, according to the zoom lens system having a camera shake compensating function according to the present invention, by using for camera shake compensation the second lens unit serving as a zooming lens unit, the generation of decentering aberration is restrained while required compactness is maintained. Moreover, by arranging the second lens unit to have a negative, positive power configuration and arranging the aperture stop behind the second lens unit, the off-axial image point movement error and the one-side blur can excellently be compensated for. Further, by increasing the distance between the first and second lens unit to perform zooming from the shorter focal length side to the longer focal length side, chromatic aberration is excellently corrected. Thus, even in a zoom lens system with a magnification of 3× or higher, camera shake compensation is made while required compactness is maintained and high optical performance is maintained in the entire zoom range.

In addition, since distortion is excellently corrected by fulfilling the condition (1) and spherical aberration is excellently corrected by fulfilling the condition (2), optical performances both before and after the compensation are improved.

Obviously, many modifications and variations of the present invention are possible in light of the above teachings. It is therefore to be understood that within the scope of the appended claims, the invention may be practiced other than as specifically described.

TABLE 1

(1st Embodiment)
f = 38.9 to 112.7   FNo. = 4.12 to 10.06

| Radius of Curvature | Axial Distance | Refractive Index | Abbe Number |
|---|---|---|---|
| r1  −23.134 | | | |
| | d1  1.480 | N1  1.80500 | ν1  40.97 |
| r2  −43.384 | | | |
| | d2  0.691 | | |
| r3  84.476 | | | |
| | d3  3.947 | N2  1.48749 | ν2  70.44 |
| r4  −28.730 | | | |
| | d4  1.974 to 19.858 | | |
| r5*  37.755 | | | |
| | d5  2.862 | N3  1.84506 | ν3  23.66 |
| r6*  29.619 | | | |
| | d6  1.974 | | |
| r7  −37.076 | | | |
| | d7  3.257 | N4  1.51680 | ν4  64.20 |
| r8  −11.740 | | | |
| | d8  2.566 | | |
| r9  ∞ (Aperture stop) | | | |
| | d9  14.277 to 1.776 | | |
| r10*  −93.451 | | | |
| | d10  3.454 | N5  1.58340 | ν5  30.23 |
| r11*  −29.294 | | | |
| | d11  3.651 | | |
| r12  −12.159 | | | |
| | d12  0.987 | N6  1.78850 | ν6  45.68 |
| r13  −98.834 | | | |
| | Σd = 41.119 to 46.502 | | |

Aspherical Coefficients r5: ε = 1.0000
    A4 = −0.17862 × $10^{-3}$
    A6 = −0.16659 × $10^{-5}$
    A8 = −0.38927 × $10^{-8}$
    A10 = 0.44900 × $10^{-10}$
    A12 = −0.16019 × $10^{-11}$
r6: ε = 1.0000
    A4 = −0.13469 × $10^{-3}$
    A6 = −0.14553 × $10^{-5}$
    A8 = 0.13468 × $10^{-7}$
    A10 = −0.11665 × $10^{-9}$
    A12 = −0.10306 × $10^{-11}$
    A14 = 0.67707 × $10^{-15}$
    A16 = 0.60892 × $10^{-16}$
R10: ε = 1.0000
    A3 = −0.37915 × $10^{-3}$
    A4 = 0.20239 × $10^{-3}$
    A5 = −0.40425 × $10^{-4}$
    A6 = 0.44402 × $10^{-5}$ TABLE 1-continued

```
        A7  =  0.77130 × 10⁻⁷
        A8  = -0.46861 × 10⁻⁷
        A9  = -0.43276 × 10⁻⁹
        A10 =  0.33181 × 10⁻⁹
        A11 =  0.80295 × 10⁻¹¹
        A12 = -0.22144 × 10⁻¹¹
        A13 = -0.39322 × 10⁻¹⁴
        A14 = -0.37118 × 10⁻¹⁷
r11: ε = 1.0000
        A3  = -0.31594 × 10⁻³
        A4  =  0.72536 × 10⁻⁴
        A5  = -0.11831 × 10⁻⁴
        A6  = -0.18478 × 10⁻⁷
        A7  =  0.54421 × 10⁻⁷
        A8  =  0.44369 × 10⁻⁷
        A9  = -0.91140 × 10⁻⁸
        A10 =  0.12688 × 10⁻⁹
        A11 =  0.50618 × 10⁻¹⁰
        A12 = -0.17558 × 10⁻¹²
        A13 = -0.23579 × 10⁻¹²
```

TABLE 2

(2nd Embodiment)
f = 38.2 to 147.0     FNo. = 3.55 to 9.57

| Radius of Curvature | | Axial Distance | | Refractive Index | | Abbe Number | |
|---|---|---|---|---|---|---|---|
| r1 | 29.916 | | | | | | |
| | | d1 | 1.571 | N1 | 1.84666 | ν1 | 23.82 |
| r2 | 23.932 | | | | | | |
| | | d2 | 0.687 | | | | |
| r3 | 23.477 | | | | | | |
| | | d3 | 4.517 | N2 | 1.51680 | ν2 | 64.20 |
| r4 | 69.470 | | | | | | |
| | | d4 | 3.928 to 33.619 | | | | |
| r5* | -30.365 | | | | | | |
| | | d5 | 1.277 | N3 | 1.76683 | ν3 | 49.47 |
| r6* | 21.645 | | | | | | |
| | | d6 | 1.964 | | | | |
| r7 | 25.792 | | | | | | |
| | | d7 | 2.602 | N4 | 1.83350 | ν4 | 21.00 |
| r8 | -259.608 | | | | | | |
| | | d8 | 1.915 | | | | |
| r9 | 25.444 | | | | | | |
| | | d9 | 1.669 | N5 | 1.83350 | ν5 | 21.00 |
| r10 | 12.325 | | | | | | |
| | | d10 | 4.822 | N6 | 1.51178 | ν6 | 69.07 |
| r11* | -14.971 | | | | | | |
| | | d11 | 1.080 | | | | |
| r12 | ∞ (Aperture stop) | | | | | | |
| | | d12 | 21.121 to 2.875 | | | | |
| r13* | -41.831 | | | | | | |
| | | d13 | 3.634 | N7 | 1.84506 | ν7 | 23.66 |
| r14* | -24.936 | | | | | | |
| | | d14 | 3.044 | | | | |
| r15 | -14.963 | | | | | | |
| | | d15 | 1.178 | N8 | 1.75450 | ν8 | 51.57 |
| r16 | -2311.924 | | | | | | |

Σd = 55.010 to 66.456

Aspherical Coefficients

```
r5: ε = 1.0000
        A4  = -0.10080 × 10⁻³
        A6  =  0.17197 × 10⁻⁵
        A8  = -0.17247 × 10⁻⁷
        A10 =  0.82125 × 10⁻¹⁰
        A12 = -0.72093 × 10⁻¹²
r6: ε = 1.0000
        A4  = -0.52707 × 10⁻⁴
        A6  =  0.15108 × 10⁻⁵
        A8  =  0.33309 × 10⁻⁸
        A10 = -0.17757 × 10⁻⁹
        A12 =  0.60417 × 10⁻¹⁴
```

TABLE 2-continued

```
R11: ε = 1.0000
        A4  =  0.12379 × 10⁻⁴
        A6  =  0.59111 × 10⁻⁶
        A8  = -0.40424 × 10⁻⁷
        A10 =  0.97489 × 10⁻⁹
        A12 = -0.90941 × 10⁻¹¹
r13: ε = 1.0000
        A4  =  0.17108 × 10⁻⁴
        A6  = -0.28707 × 10⁻⁶
        A8  =  0.57772 × 10⁻⁸
        A10 = -0.48868 × 10⁻¹⁰
        A12 =  0.16153 × 10⁻¹²
r14: ε = 1.0000
        A4  = -0.45301 × 10⁻⁵
        A6  = -0.31847 × 10⁻⁶
        A8  =  0.56666 × 10⁻⁸
        A10 = -0.47316 × 10⁻¹⁰
        A12 =  0.13749 × 10⁻¹²
```

TABLE 3

| | 1st embodiment | 2nd embodiment |
|---|---|---|
| $\dfrac{\phi_I}{\phi_W}$ | 0.325 | 0.320 |
| $\phi_{DF}$ | -0.00516 | -0.02076 |
| $C_{DR}$ | -0.08518 | -0.06680 |
| $\dfrac{\phi_{DF}}{C_{DR}}$ | 0.06057 | 0.31077 |
| $\dfrac{(0.7 \times C_{1M}) + C_{2M}}{\Phi_{WIDE}}$ | -0.147 | -0.365 |

TABLE 4

| | 1st embodiment | | 2nd embodiment | |
|---|---|---|---|---|
| | W | T | W | T |
| Off-axial image point movement error: $\Delta Y_y'$ | -0.010 | 0.002 | 0.007 | 0.001 |
| Off-axial image point movement error: $\Delta Y_z'$ | 0.033 | 0.013 | 0.035 | 0.011 |
| Meridional one-side blur: $\Delta M'$ | -0.156 | -0.172 | -0.166 | 0.102 |
| Sagittal one-side blur: $\Delta S'$ | 0.075 | 0.329 | 0.036 | 0.596 |
| Axial coma: AXCM | -0.002 | -0.019 | -0.001 | -0.029 |
| Axial lateral chromatic aberration | 0.008 | 0.023 | 0.002 | 0.019 |

What is claimed is:

1. A zoom lens system consisting from an object side:

a first lens unit of a positive refractive power;

a second lens unit of a positive refractive power movable in a vertical direction relative to an optical axis for compensation of an image blur caused by vibration of the entire zoom lens system, said second lens unit consisting of three or less lens elements; and a third lens unit of a negative refractive power;

wherein said first through third lens units are movable in an optical axis direction for zooming from a shortest focal length condition to a longest focal length condition so that a distance between said first and second lens units increases and a distance between said second and third lens units decreases, wherein a most image side surface of the second lens unit is convex to an image side and the following condition is fulfilled:

$$0.03 < \frac{\phi_{DF}}{C_{DR}} < 0.5$$

where $\phi_{DF}$ is a refractive power of a front lens unit of the second lens unit and $C_{DR}$ is a curvature of the most image side surface of the second lens unit.

2. A zoom lens system as claimed in claim 1, wherein the following condition is fulfilled:

$$0 < \frac{\phi_I}{\phi_W} < 0.57$$

where $\phi_I$ is a refractive power of the first lens unit and $\phi_W$ is a refractive power of the entire zoom lens system at a shortest focal length condition.

3. A zoom lens system consisting from an object side:
a first lens unit of a positive refractive power;
a second lens unit of a positive refractive power movable in a vertical direction relative to an optical axis for compensation of an image blur caused by vibration of the entire zoom lens system, said second lens unit consisting of three or less lens elements; and
a third lens unit of a negative refractive power,
wherein said first through third lens units are movable in an optical axis direction for zooming from a shortest focal length condition to a longest focal length condition so that a distance between said first and second lens units increases and a distance between said second and third lens units decreases, wherein the second lens unit consisting of from the object side, a front lens unit of a negative refractive power including a negative lens element and a rear lens unit of a positive refractive power including a negative lens element, wherein the following condition is fulfilled:

$$-0.7 < \frac{(0.7 \times C_{1M}) + C_{2M}}{\Phi_{WIDE}} < 0$$

where $C_{1M}$ is a curvature of an object side surface of a negative lens element of the first lens unit, $C_{2M}$ is a curvature of an object side surface of a negative lens element of the second lens unit and $\Phi_{WIDE}$ is a refractive power of the entire zoom lens system at a shortest focal length condition.

4. A zoom lens system as claimed in claim 3, wherein the following condition is fulfilled:

$$0 < \frac{\phi_I}{\phi_W} < 0.57$$

where $\phi_I$ is a refractive power of the first lens unit and $\phi_W$ is a refractive power of the entire zoom lens system at a shortest focal length condition.

5. A zoom lens system consisting from an object side:
a first lens unit of a positive refractive power;
a second lens unit of a positive refractive power movable in a vertical direction relative to an optical axis for compensation of an image blur caused by vibration of the entire zoom lens system;
an aperture stop; and
a third lens unit of a negative refractive power, wherein said first through third lens units are movable in an optical axis direction for zooming from a shortest focal length condition to a longest focal length condition so that a distance between said first and second lens units increases and a distance between said second and third lens units decreases wherein a most image side surface of the second lens unit is convex to an image side and the following condition is fulfilled:

$$0.03 < \frac{\phi_{DF}}{C_{DR}} < 0.5$$

where $\phi_{DF}$ is a refractive power of a front lens unit of the second lens unit and $C_{DR}$ is a curvature of the most image side surface of the second lens unit.

6. A zoom lens system as claimed in claim 5, wherein the following condition is fulfilled:

$$0 < \frac{\phi_I}{\phi_W} < 0.57$$

where $\Phi_I$ is a refractive power of the first lens unit and $\Phi_W$ is a refractive power of the entire zoom lens system at a shortest focal length condition.

7. A zoom lens system as claimed in claim 5, wherein the second lens unit consisting of from the object side, a front lens unit of a negative refractive power including a negative lens element and a rear lens unit of a positive refractive power including a negative lens element, wherein the following condition is fulfilled:

$$-0.7 < \frac{(0.7 \times C_{1M}) + C_{2M}}{\Phi_{WIDE}} < 0$$

where $C_{1M}$ is a curvature of an object side surface of a negative lens element of the first lens unit, $C_{2M}$ is a curvature of an object side surface of a negative lens element of front lens unit of the second lens unit.

8. A zoom lens system as claimed in claim 5, wherein said second lens unit consists of from the object side:
a front lens unit of a negative refractive power; and
a rear lens unit of a positive refractive power.

9. A zoom lens system consisting of from an object side:
a first lens unit of a positive refractive power;
a second lens unit of a positive refractive power movable in a vertical direction relative to an optical axis for compensation of an image blur caused by vibration of the entire zoom lens system, said second lens unit consisting of a front lens unit of a negative refractive power and a real lens unit of a positive refractive power; and
a third lens unit of a negative refractive power,
wherein said first through third lens units are movable in an optical axis direction for zooming from a wide-angle condition to a telephoto condition so that a distance between said first and second lens units increases and a distance between said second and third lens units decreases, wherein the following condition is fulfilled:

$$0.03 < \Phi_{DF}/C_{DR} < 0.5$$

where $\Phi_{DF}$ is a refractive power of the first lens unit of the second lens unit and $C_{DR}$ is a curvature of the most image side surface of the second lens unit.

10. A zoom lens system as claimed in claim 9, wherein the following condition is fulfilled:

$$0<\phi_1/\phi_W<0.57$$

where $\phi_1$ is a refractive power of the first lens unit and $\phi_W$ is a refractive power of the entire zoom lens system at a shortest focal length condition.

11. A zoom lens system as claimed in claim 9, wherein the following condition is fulfilled:

$$-0.7 < \frac{(0.7 \times C_{1M}) + C_{2M}}{\Phi_{WIDE}} < 0$$

wherein $C_{1M}$ is a curvature of an object side surface of a negative lens element of the first lens unit, $C_{2M}$ is a curvature of an object side of a negative lens element of the front lens unit of the second lens unit.

12. A zoom lens system consisting of from an object side:
a first lens unit of a positive refractive power;
a second lens unit of a positive refractive power movable in a vertical direction relative to an optical axis for compensation of an image blur caused by vibration of the entire zoom lens system, said second lens unit consisting of a front lens unit of a negative refractive power and rear lens unit of a positive refractive power;
an aperture stop; and
a third lens unit of a negative refractive power,
wherein said first through third lens units are movable in an optical axis direction for zooming from a wide angle condition to telephoto condition so that a distance between said first and second lens units increases and a distance between said second and third lens units decreases, wherein the following condition is fulfilled:

$$0.03<\Phi_{DF}/C_{DR}<0.5$$

where $\Phi_{DF}$ is a refractive power of the front lens unit of the second lens unit and $C_{DR}$ is a curvature of the most image side surface of the second lens unit.

13. A zoom lens system as claimed in claim 12, wherein the following condition is fulfilled:

$$0<\phi_1/\phi_W<0.57$$

where $\phi_1$ is a refractive power of the first lens unit and $\phi_W$ is a refractive power of the entire zoom lens system at a shortest focal length condition.

14. A zoom lens system as claimed in claim 12, wherein the following condition is fulfilled:

$$-0.7 < \frac{(0.7 \times C_{1M}) + C_{2M}}{\Phi_{WIDE}} < 0$$

wherein $C_{1M}$ is a curvature of an object side surface of a negative lens element of the first lens unit, $C_{2M}$ is a curvature of an object side surface of a negative lens element of the front lens unit of the second lens unit.

* * * * *